INVENTOR.
Albert E. Wolfe Jr.

Fig. 3

30 31

FRAME — ODD FIELD / EVEN FIELD

| Field | Pulses | LEADING EDGE COUNT | COUNTERS D RADIX 525 | COUNTERS C RADIX 2 | COUNTERS B RADIX 5 | COUNTERS A RADIX 5 | TRAILING EDGE COUNT | COUNTERS D RADIX 525 | COUNTERS C RADIX 2 | COUNTERS B RADIX 5 | COUNTERS A RADIX 5 |
|---|---|---|---|---|---|---|---|---|---|---|---|
| ODD FIELD | EQUALIZING PULSES | 1 | 0 | 0 | 0 | 1 | 3 | 0 | 0 | 0 | 3 |
| | | 26 | 1 | 1 | 0 | 1 | 28 | 1 | 1 | 0 | 3 |
| | | 51 | 2 | 0 | 0 | 1 | 53 | 2 | 0 | 0 | 3 |
| | | 76 | 3 | 1 | 0 | 1 | 78 | 3 | 1 | 0 | 3 |
| | | 101 | 4 | 0 | 0 | 1 | 103 | 4 | 0 | 0 | 3 |
| | | 126 | 5 | 1 | 0 | 1 | 128 | 5 | 1 | 0 | 3 |
| | 28 SERRATED VERT. PULSES | 151 | 6 | 0 | 0 | 1 | 172 | 6 | 0 | 4 | 2 |
| | | 176 | 7 | 1 | 0 | 1 | 197 | 7 | 1 | 4 | 2 |
| | | 201 | 8 | 0 | 0 | 1 | 222 | 8 | 0 | 4 | 2 |
| | | 226 | 9 | 1 | 0 | 1 | 247 | 9 | 1 | 4 | 2 |
| | | 251 | 10 | 0 | 0 | 1 | 272 | 10 | 0 | 4 | 2 |
| | | 276 | 11 | 1 | 0 | 1 | 297 | 11 | 1 | 4 | 2 |
| | EQUALIZING PULSES | 301 | 12 | 0 | 0 | 1 | 303 | 12 | 0 | 0 | 3 |
| | | 326 | 13 | 1 | 0 | 1 | 328 | 13 | 1 | 0 | 3 |
| | | 351 | 14 | 0 | 0 | 1 | 353 | 14 | 0 | 0 | 3 |
| | | 376 | 15 | 1 | 0 | 1 | 378 | 15 | 1 | 0 | 3 |
| | | 401 | 16 | 0 | 0 | 1 | 403 | 16 | 0 | 0 | 3 |
| | | 426 | 17 | 1 | 0 | 1 | 428 | 17 | 1 | 0 | 3 |
| | 29 HORIZONTAL SYNC. PULSES | 451 | 18 | 0 | 0 | 1 | 455 | 18 | 0 | 1 | 0 |
| | | 501 | 20 | 0 | 0 | 1 | 505 | 20 | 0 | 1 | 0 |
| | | 551 | 22 | 0 | 0 | 1 | 555 | 22 | 0 | 1 | 0 |
| | | ... | ... | ... | ... | ... | ... | ... | ... | ... | ... |
| | | 13051 | 522 | 0 | 0 | 1 | 13055 | 522 | 0 | 1 | 0 |
| | | 13101 | 524 | 0 | 0 | 1 | 13105 | 524 | 0 | 1 | 0 |
| EVEN FIELD | EQUALIZING PULSES | 13126 | 0 | 1 | 0 | 1 | 13128 | 0 | 1 | 0 | 3 |
| | | 13151 | 1 | 0 | 0 | 1 | 13153 | 1 | 0 | 0 | 3 |
| | | 13176 | 2 | 1 | 0 | 1 | 13178 | 2 | 1 | 0 | 3 |
| | | 13201 | 3 | 0 | 0 | 1 | 13203 | 3 | 0 | 0 | 3 |
| | | 13226 | 4 | 1 | 0 | 1 | 13228 | 4 | 1 | 0 | 3 |
| | | 13251 | 5 | 0 | 0 | 1 | 13253 | 5 | 0 | 0 | 3 |
| | SERRATED VERT. PULSES | 13276 | 6 | 1 | 0 | 1 | 13297 | 6 | 1 | 4 | 2 |
| | | 13301 | 7 | 0 | 0 | 1 | 13322 | 7 | 0 | 4 | 2 |
| | | 13326 | 8 | 1 | 0 | 1 | 13347 | 8 | 1 | 4 | 2 |
| | | 13351 | 9 | 0 | 0 | 1 | 13372 | 9 | 0 | 4 | 2 |
| | | 13376 | 10 | 1 | 0 | 1 | 13397 | 10 | 1 | 4 | 2 |
| | | 13401 | 11 | 0 | 0 | 1 | 13422 | 11 | 0 | 4 | 2 |
| | EQUALIZING PULSES | 13426 | 12 | 1 | 0 | 1 | 13428 | 12 | 1 | 0 | 3 |
| | | 13451 | 13 | 0 | 0 | 1 | 13453 | 13 | 0 | 0 | 3 |
| | | 13476 | 14 | 1 | 0 | 1 | 13478 | 14 | 1 | 0 | 3 |
| | | 13501 | 15 | 0 | 0 | 1 | 13503 | 15 | 0 | 0 | 3 |
| | | 13526 | 16 | 1 | 0 | 1 | 13528 | 16 | 1 | 0 | 3 |
| | | 13551 | 17 | 0 | 0 | 1 | 13553 | 17 | 0 | 0 | 3 |
| | HORIZONTAL SYNC. PULSES | 13601 | 19 | 0 | 0 | 1 | 13605 | 19 | 1 | 1 | 0 |
| | | 13651 | 21 | 0 | 0 | 1 | 13655 | 21 | 0 | 1 | 0 |
| | | 13701 | 23 | 0 | 0 | 1 | 13705 | 23 | 0 | 1 | 0 |
| | | ... | ... | ... | ... | ... | ... | ... | ... | ... | ... |
| | | 26151 | 521 | 0 | 0 | 1 | 26155 | 521 | 0 | 1 | 0 |
| | | 26201 | 523 | 0 | 0 | 1 | 26205 | 523 | 0 | 1 | 0 |
| | | 1 | 0 | 0 | 0 | 1 | 3 | 0 | 0 | 0 | 3 |
| | | 26 | 1 | 1 | 0 | 1 | 28 | 1 | 1 | 0 | 3 |

INVENTOR.

Albert E. Wolfe Jr.

Fig. 4

33 34

FRAME; VERTICAL BLANKING; HORIZONTAL BLANKING

| LEADING EDGE COUNT | COUNTERS D RADIX 525 | C RADIX 2 | B RADIX 5 | A RADIX 5 | TRAILING EDGE COUNT | COUNTERS D RADIX 525 | C RADIX 2 | B RADIX 5 | A RADIX 5 |
|---|---|---|---|---|---|---|---|---|---|
| 0 | 0 | 0 | 0 | 0 | 808 | 32 | 0 | 1 | 3 |
| 850 | 34 | 0 | 0 | 0 | 858 | 34 | 0 | 1 | 3 |
| 900 | 36 | 0 | 0 | 0 | 908 | 36 | 0 | 1 | 3 |
| 950 | 38 | 0 | 0 | 0 | 958 | 38 | 0 | 1 | 3 |
| ... | ... | ... | ... | ... | ... | ... | ... | ... | ... |
| 13100 | 524 | 0 | 0 | 0 | 13108 | 524 | 0 | 1 | 3 |
| 13125 | 0 | 1 | 0 | 0 | 13933 | 32 | 1 | 1 | 3 |
| 13950 | 33 | 0 | 0 | 0 | 13958 | 33 | 0 | 1 | 3 |
| 14000 | 35 | 0 | 0 | 0 | 14008 | 35 | 0 | 1 | 3 |
| ... | ... | ... | ... | ... | ... | ... | ... | ... | ... |
| 26150 | 521 | 0 | 0 | 0 | 26158 | 521 | 0 | 1 | 3 |
| 26200 | 523 | 0 | 0 | 0 | 26208 | 523 | 0 | 1 | 3 |
| 0 | 0 | 0 | 0 | 0 | 808 | 32 | 0 | 1 | 3 |

Fig. 12

| | D RADIX 525 | COUNTERS | G RADIX 15 | F RADIX 5 | E RADIX 7 | |
|---|---|---|---|---|---|---|
| $D^{0/5}$ | 0 | | 0 | 0 | 0 | $D^{0} = G^{0}F^{0}E^{0}$ |
| | 1 | | 0 | 0 | 1 | $D^{0/5} = G^{0}F^{0}E^{0/5}$ |
| | 2 | | 0 | 0 | 2 | |
| | 3 | | 0 | 0 | 3 | |
| | 4 | | 0 | 0 | 4 | |
| | 5 | | 0 | 0 | 5 | |
| $D^{6/11}$ | 6 | | 0 | 0 | 6 | $D^{6/11} = G^{0}F^{1/1}(E^{5})'$ |
| | 7 | | 0 | 1 | 0 | |
| | 8 | | 0 | 1 | 1 | |
| | 9 | | 0 | 1 | 2 | |
| | 10 | | 0 | 1 | 3 | |
| | 11 | | 0 | 1 | 4 | |
| $D^{12/17}$ | 12 | | 0 | 1 | 5 | $D^{12/17} = G^{0}F^{1/2}(E^{4})'$ |
| | 13 | | 0 | 1 | 6 | |
| | 14 | | 0 | 2 | 0 | |
| | 15 | | 0 | 2 | 1 | |
| | 16 | | 0 | 2 | 2 | |
| | 17 | | 0 | 2 | 3 | |
| | | | | | | |
| | 32 | | 0 | 4 | 4 | $D^{32} = G^{0}F^{4}E^{4}$ |
| | | | | | | |
| | 523 | | 14 | 4 | 5 | $D^{523} = G^{14}F^{4}E^{5}$ |

INVENTOR.

Albert E. Wolfe Jr.

INVENTOR.

Albert E. Wolfe Jr.

$$A_1 = \{D^{0/17}B^0A^1 + D^{18/524}C^0B^0A^1\}P$$

$$_0A_1 = \{(D^{0/5}+D^{12/17})B^0A^3 + D^{6/11}B^4A^2 + D^{18/524}C^0B^1A^0\}P$$

$$h_1 = C^0B^0A^1P$$

$$_0h_1 = C^0B^1A^0P$$

$$v_1 = D^0B^0A^0P$$

$$_0v_1 = D^{32}B^1A^3P$$

$$m_1 = \{D^0B^0A^0 + D^{33/524}C^0B^0A^0\}P$$

$$_0m_1 = \{D^{32}B^1A^3 + D^{33/524}C^0B^1A^3\}P$$

INVENTOR.

Albert E. Wolfe Jr.

Fig. 9a
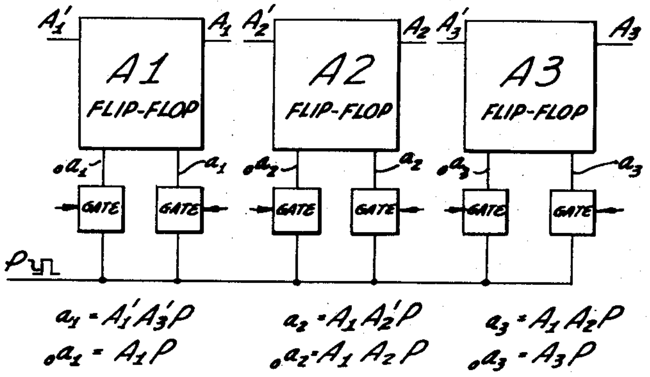
Fig. 9b
| | A1 | A2 | A3 |
|---|---|---|---|
| $A^0$ | 0 | 0 | 0 |
| $A^1$ | 1 | 0 | 0 |
| $A^2$ | 0 | 1 | 0 |
| $A^3$ | 1 | 1 | 0 |
| $A^4$ | 0 | 0 | 1 |
Fig. 9c
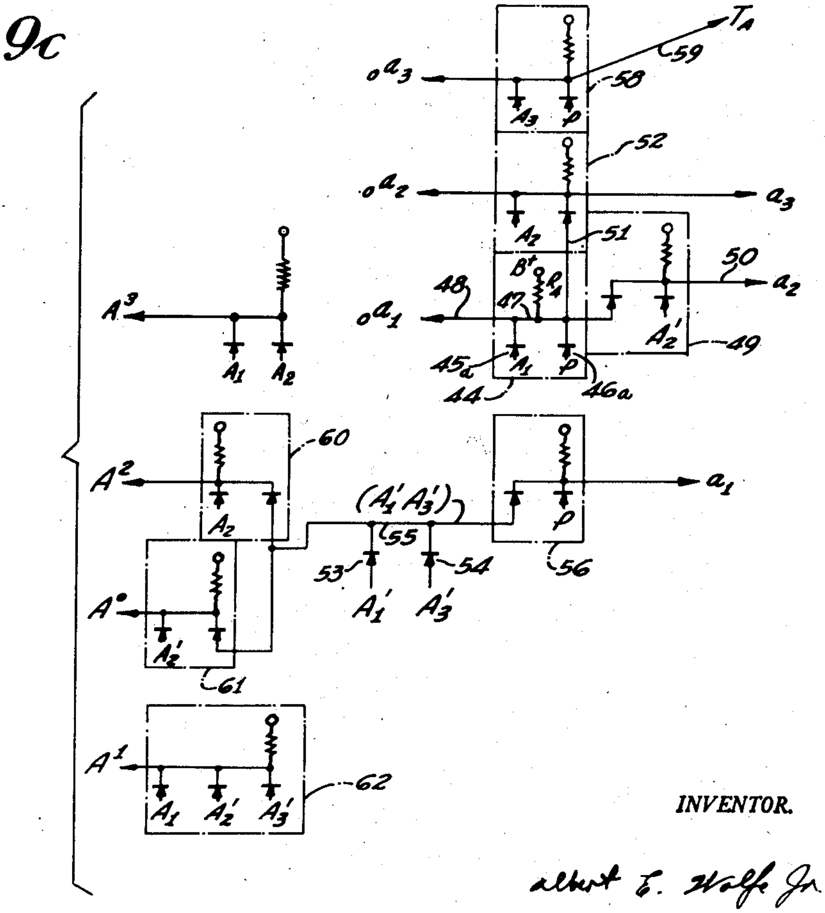
INVENTOR.

Fig. 10a
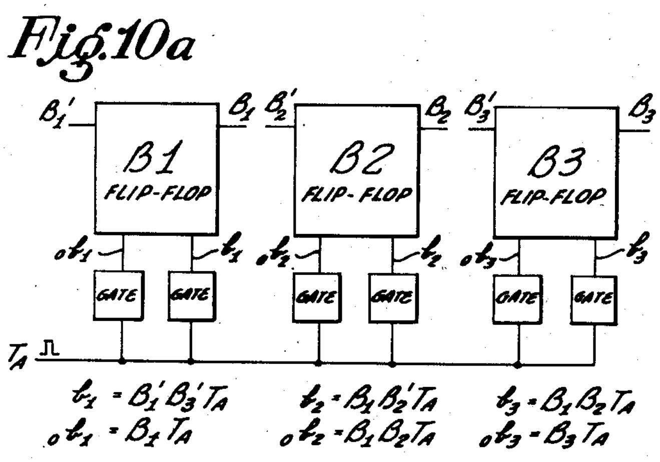
Fig. 10b
| | B1 | B2 | B3 |
|---|---|---|---|
| $B^0$ | 0 | 0 | 0 |
| $B^1$ | 1 | 0 | 0 |
| $B^2$ | 0 | 1 | 0 |
| $B^3$ | 1 | 1 | 0 |
| $B^4$ | 0 | 0 | 1 |
Fig. 10c
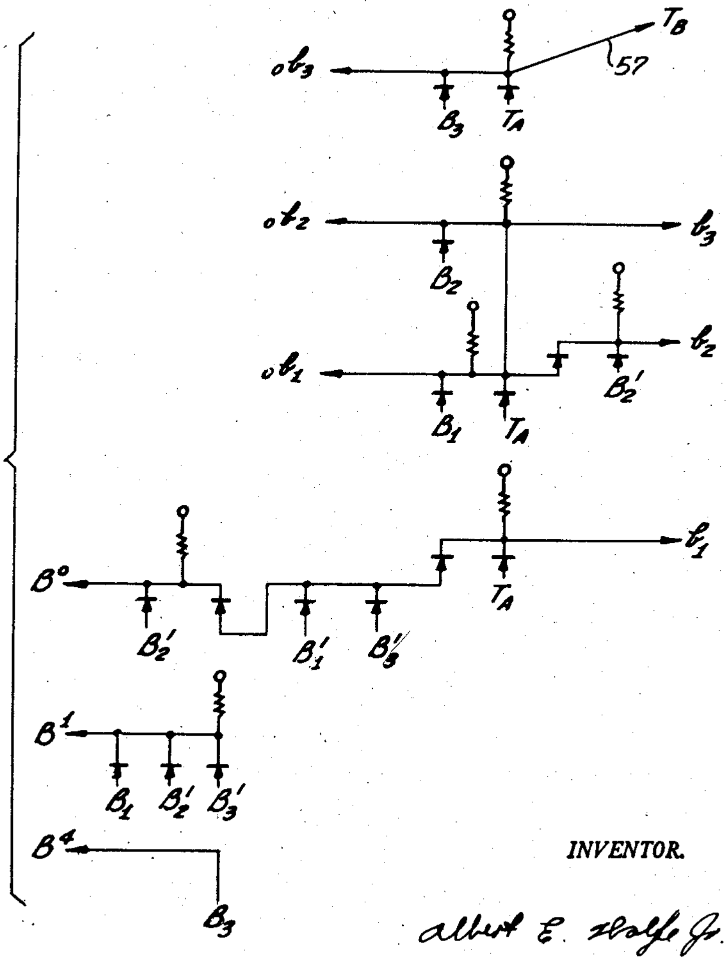
INVENTOR.
Albert E. Wolfe Jr.

Fig. 11
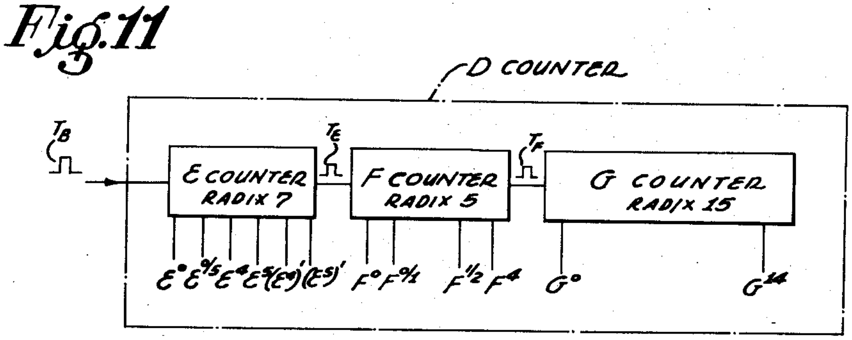
Fig. 13a
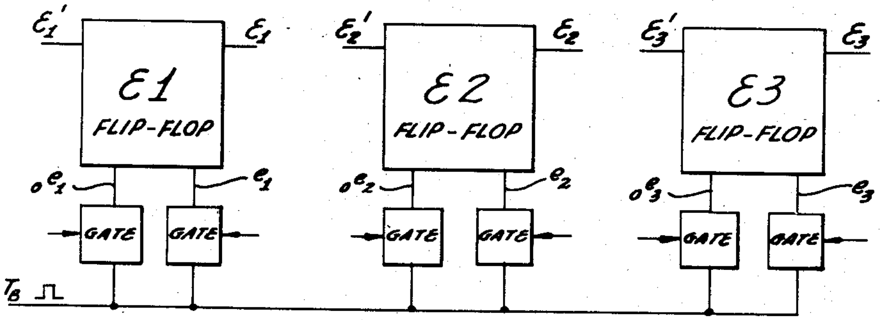
$e_1 = \mathcal{E}_1' T_B$ $e_2 = \mathcal{E}_1 \mathcal{E}_2' T_B$ $e_3 = \mathcal{E}_1 \mathcal{E}_2 \mathcal{E}_3' T_B$
${}_0e_1 = \mathcal{E}_1(\mathcal{E}_2' + \mathcal{E}_3') T_B$ ${}_0e_2 = \mathcal{E}_1 \mathcal{E}_2 T_B$ ${}_0e_3 = \mathcal{E}_1 \mathcal{E}_2 \mathcal{E}_3 T_B$
Fig. 13b
| | E1 | E2 | E3 |
|---|---|---|---|
| $\mathcal{E}^0$ | 0 | 1 | 0 |
| $\mathcal{E}^1$ | 1 | 1 | 0 |
| $\mathcal{E}^2$ | 0 | 0 | 1 |
| $\mathcal{E}^3$ | 1 | 0 | 1 |
| $\mathcal{E}^4$ | 0 | 1 | 1 |
| $\mathcal{E}^5$ | 1 | 1 | 1 |
| $\mathcal{E}^6$ | 1 | 0 | 0 |
INVENTOR.
Albert E. Wolfe Jr.

INVENTOR.

Albert E. Wolfe Jr.

Fig. 14a
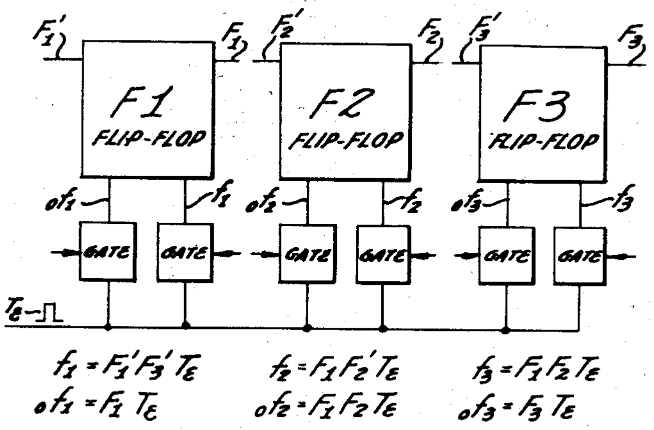
Fig. 14b
| | F1 | F2 | F3 |
|---|---|---|---|
| $F^0$ | 0 | 0 | 0 |
| $F^1$ | 1 | 0 | 0 |
| $F^2$ | 0 | 1 | 0 |
| $F^3$ | 1 | 1 | 0 |
| $F^4$ | 0 | 0 | 1 |
Fig. 14c
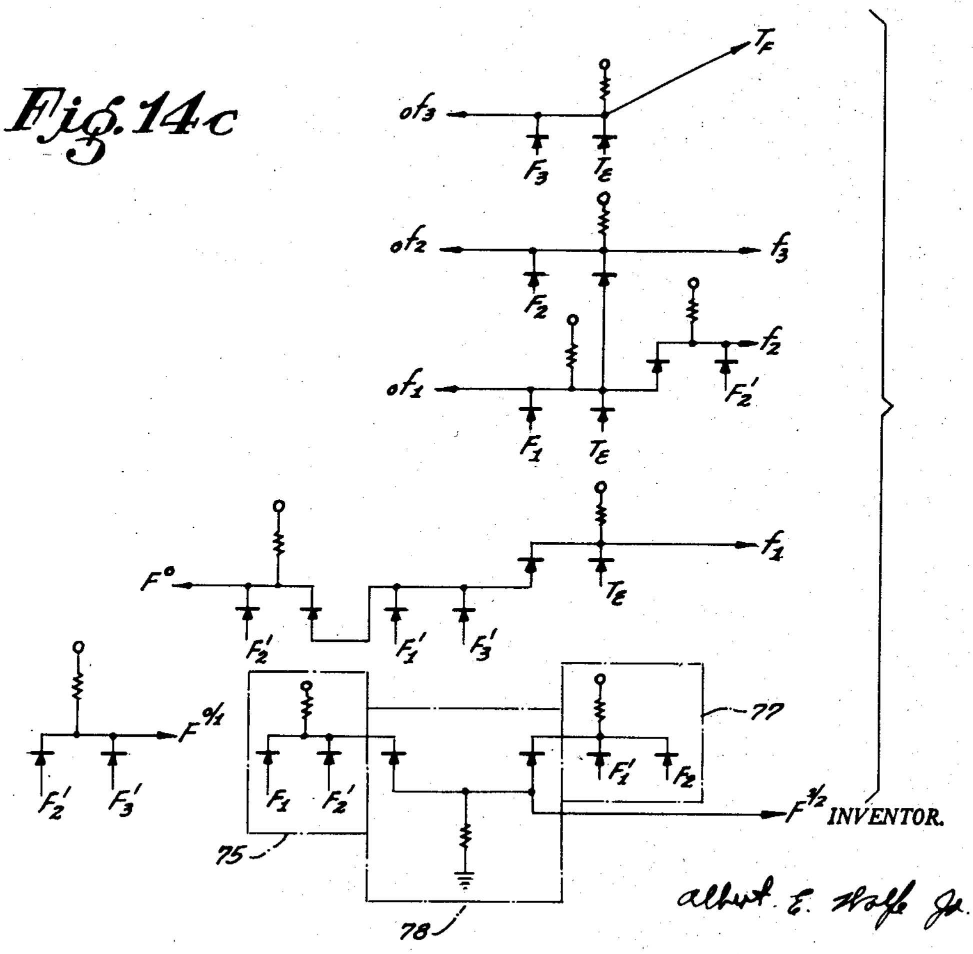
INVENTOR.
Albert E. Wolfe Jr.

Fig. 15a
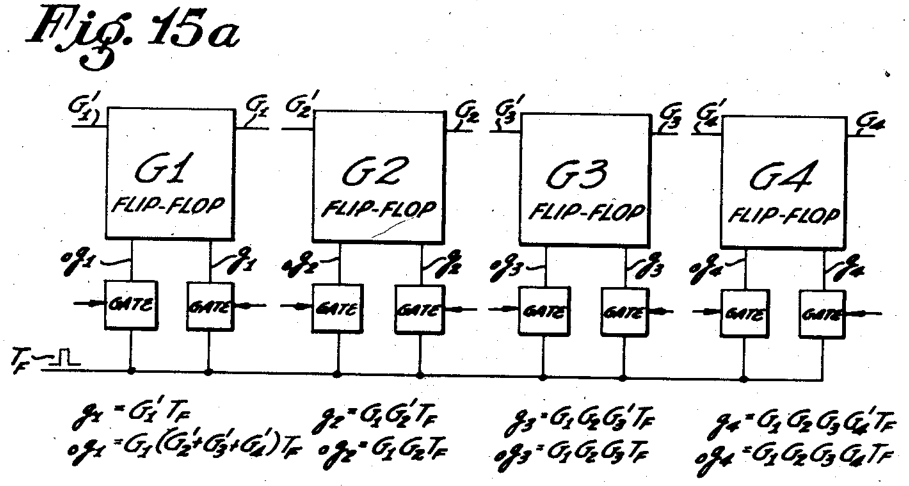
Fig. 15b
| | G1 | G2 | G3 | G4 |
|---|---|---|---|---|
| $G^0$ | 1 | 0 | 0 | 0 |
| $G^1$ | 0 | 1 | 0 | 0 |
| $G^2$ | 1 | 1 | 0 | 0 |
| $G^3$ | 0 | 0 | 1 | 0 |
| $G^4$ | 1 | 0 | 1 | 0 |
| $G^5$ | 0 | 1 | 1 | 0 |
| $G^6$ | 1 | 1 | 1 | 0 |
| $G^7$ | 0 | 0 | 0 | 1 |
| $G^8$ | 1 | 0 | 0 | 1 |
| $G^9$ | 0 | 1 | 0 | 1 |
| $G^{10}$ | 1 | 1 | 0 | 1 |
| $G^{11}$ | 0 | 0 | 1 | 1 |
| $G^{12}$ | 1 | 0 | 1 | 1 |
| $G^{13}$ | 0 | 1 | 1 | 1 |
| $G^{14}$ | 1 | 1 | 1 | 1 |
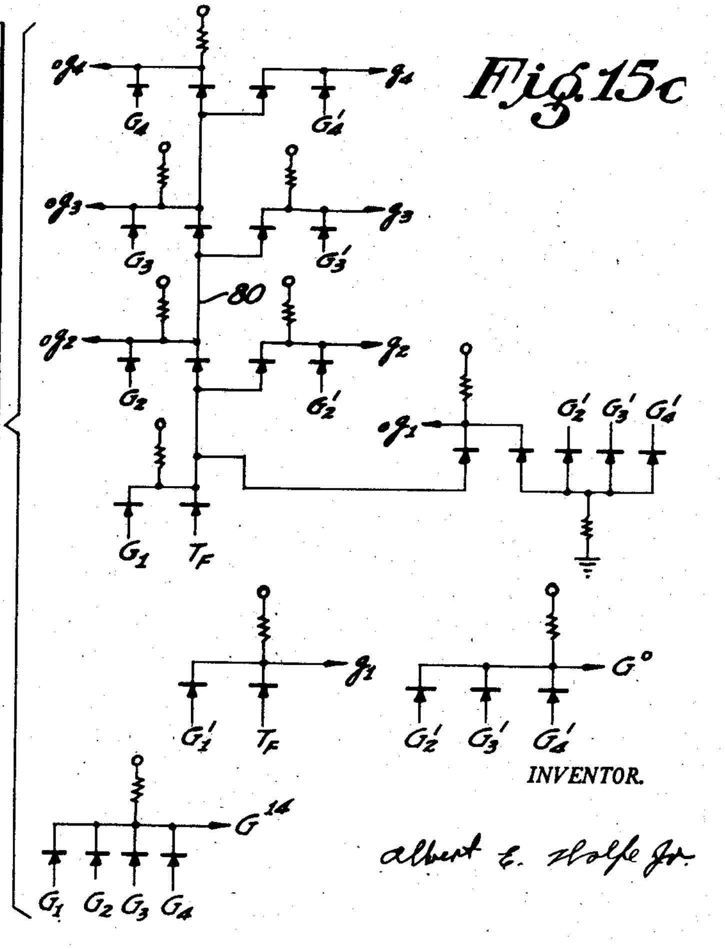
Fig. 15c
INVENTOR.
Albert E. Wolfe Jr.

INVENTOR.

Albert E. Wolfe Jr.

SYNCHRONIZING GENERATOR

Filed Dec. 18, 1950 13 Sheets-Sheet 13

INVENTOR.

Albert E. Wolfe Jr.

Patented July 7, 1953

2,644,887

UNITED STATES PATENT OFFICE 2,644,887

SYNCHRONIZING GENERATOR

Albert E. Wolfe, Jr., Compton, Calif., assignor, by mesne assignments, to Computer Research Corporation of California, a corporation of Delaware Application December 18, 1950, Serial No. 201,375

16 Claims. (Cl. 250—27)

The present invention relates to synchronizing generators, and more particularly to a novel means for producing a plurality of complex timing pulses.

While the present invention is applicable to synchronizing generators in general, it is particularly designed for producing the conventional synchronizing pulses required in television systems.

In such systems, at the broadcasting station, a synchronizing generator is employed to furnish pulses for the sweep generators scanning the camera tube, and also to produce the synchronizing pulses added to the composite video signal transmitted on the picture carrier. The latter pulses are separated from the composite video signal at the receiver to provide the timing for the sweep generators that scan the screen of the picture tube, thus making it possible for the scanning at the receiver to be synchronized with the scanning at the transmitter.

Briefly, my invention makes use of a timing device, in this case a constant frequency oscillator, providing a series of timing pulses. These pulses are counted by a series of counters, and when a predetermined number or count is reached, a switching circuit is operated to provide either a high or low voltage output. Because of the speed at which the counters and switching circuits must operate, electronic instead of electro-mechanical counters and switches are used. Additionally, in order to reduce the required number of individual counting elements, I have used the teachings of symbolic logic to combine outputs of the various counters in a novel manner. Thus, I may "add" by symbolic logic, thereby performing the process of logical addition, and I may "multiply" by symbolic logic, thereby performing logical multiplication. The circuits for performing these processes may be termed "logical nets" or "logical networks." These terms are further defined hereinafter.

One feature of the present synchronizing generator arrangement is that the timing of all the leading and trailing edges of the waveforms are obtained as the result of specific counts appearing in a cascade of counters which are actuated by pulses from a fixed frequency source.

Another feature of the arrangement is concerned with providing a cascade of counters, each of the counters having radices chosen to most simply generate the cyclical counts corresponding to the edges of the waveforms.

Still another feature is concerned with providing a complex waveform as the output of a flip-flop circuit which is adapted to be triggered into one state or the other as the result of specific counts, in a plurality of counters, corresponding to the timing of the rise and fall of the wave desired.

Still another feature of the invention is concerned with novel means for combining voltages, corresponding to specific counts in a plurality of counters, into logical propositions used for controlling flip-flops which generate the desired waveform.

Briefly, the present invention comprises a fixed high frequency pulse source feeding a cascade of counters having non-uniform radices. Specific counts of the counters are sensed as high voltages on separate lines. These voltages are logically combined in networks to generate trigger pulses which control the state of output flip-flops. The output waveforms desired are obtained by sensing the plate voltage of the flip-flops.

This invention will be better understood from the following description taken in connection with the accompanying drawings in which:

Figure 1 is a schematic block diagram showing in simplified form the apparatus involving the invention as applied to a synchronizing generator for a television system.

Figure 2*a* is a graph showing the waveform of the sync pulses generated on one output line from the generator.

Figure 2*b* is a graph showing the waveform of the horizontal drive pulses generated on another output line from the generator.

Figure 2*c* is a graph showing the waveform of the vertical drive pulses generated on still another output line from the generator.

Figure 2*d* is a graph showing the waveform of the mixed blanking pulses generated on a final output line from the generator.

Figure 3 is a table of the number contents of the counters that define in particular the leading and trailing edges of the sync pulses shown in Figure 2*a*.

Figure 4 is a table of the number contents of the counters that define in particular the leading and trailing edges of the blanking pulses shown in Figure 2*d*.

Figures 5, 6A, 8:
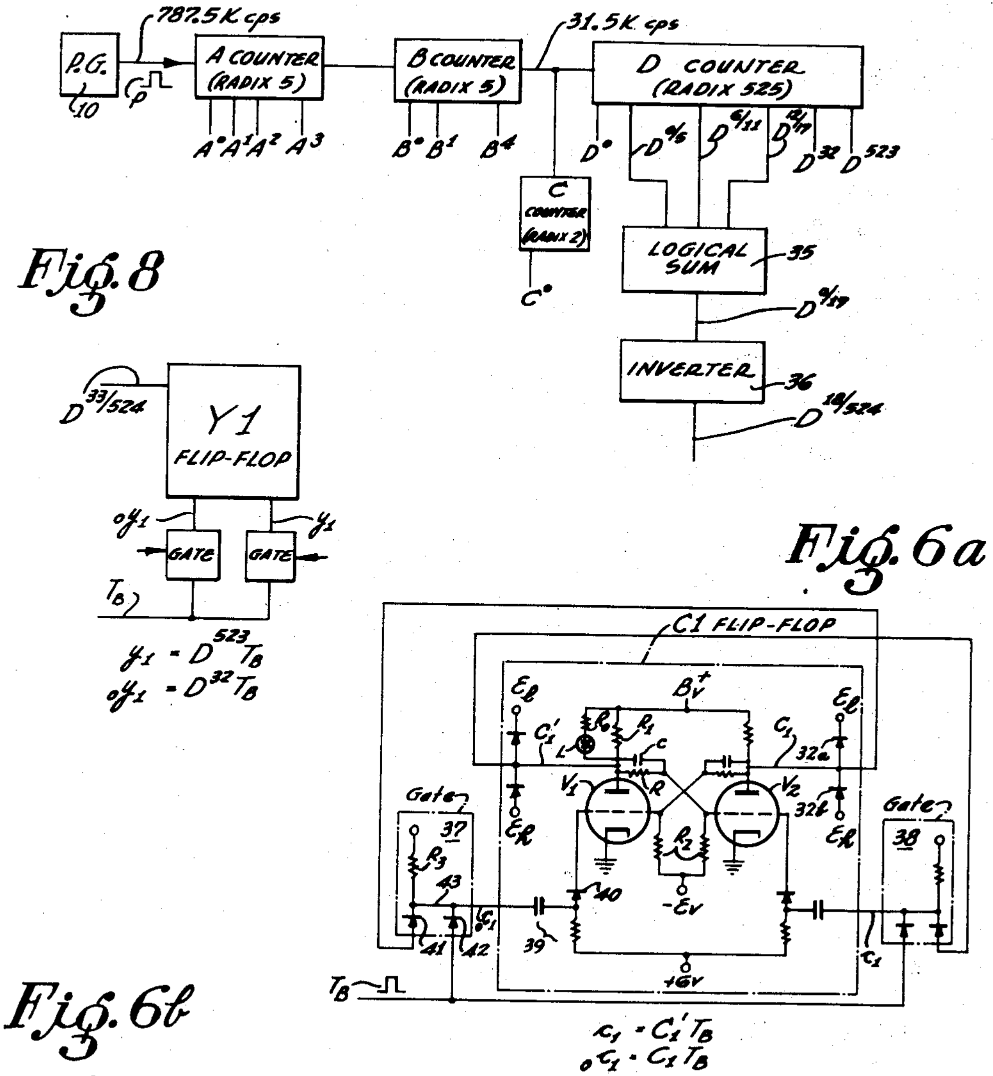
Figure 5 is a schematic block diagram of the counters and the digit contents which are to be sensed as outputs therefrom on separate lines.

Figure 6*a* is a detailed circuit diagram of the single flip-flop comprising the C counter.

Figure 6B:
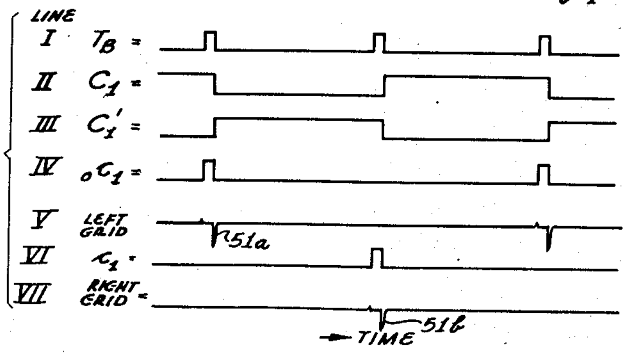

Figure 6*b* is a graph of the voltage waveforms which are referred to in explaining the operation of the C counter flip-flop.

Figure 7A:
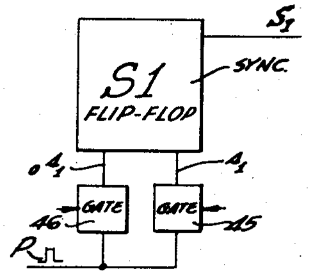

Figure 7a is a block diagram of the sync output flip-flop together with logical equations defining the triggering input for its control grids.

Figure 7B:
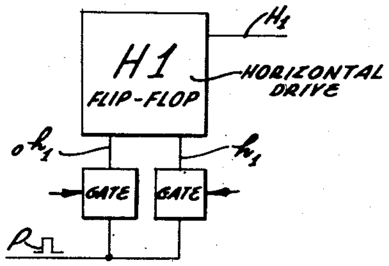

Figure 7b is a block diagram of the horizontal drive output flip-flop together with the logical equations defining the triggering inputs for its control grids.

Figure 7C:
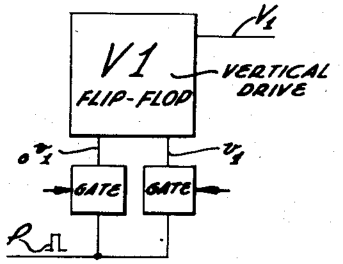

Figure 7c is a block diagram of the vertical drive output flip-flop together with the logical equations defining the triggering inputs for its control grids.

Figure 7D:
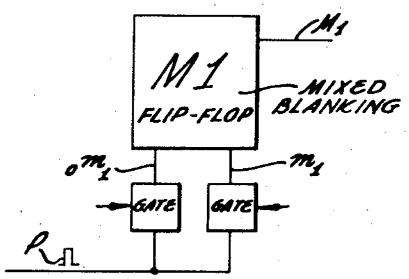

Figure 7d is a block diagram of the mixed blanking output flip-flop together with the logical equations defining the triggering inputs for its control grids.

Figure 8 is a block diagram of a flip-flop used for generating a counting interval together with its trigger logical equations.

Figure 9a is a block diagram of the A parallel counter together with the logical equations defining the triggering inputs for each of its flip-flop stages.

Figure 9b is a table of the states of the flip-flop stages characteristic of each digit content of the A counter.

Figure 9c is a schematic circuit diagram of the counting logical net and digit output logical net for the A counter.

Figure 10a is a block diagram of the B parallel counter together with the logical equations defining the triggering inputs for each of its flip-flop stages.

Figure 10b is a table of the states of the flip-flop stages characteristic of each digit content of the B counter.

Figure 10c is a schematic circuit diagram of the counting logical net and digit output logical net for the B counter.

Figure 11 is a block diagram showing a more detailed arrangement of the D counter and the digit output lines required therefrom.

Figure 12 is a table showing the digit contents of the G, F and E counters equivalent to a number in the D counter.

Figure 13a is a block diagram of the E parallel counter together with the logical equations defining the triggering inputs for each of its flip-flop stages.

Figure 13b is a table of the states of the flip-flop stages characteristic of the number content of the E counter.

Figure 13C:
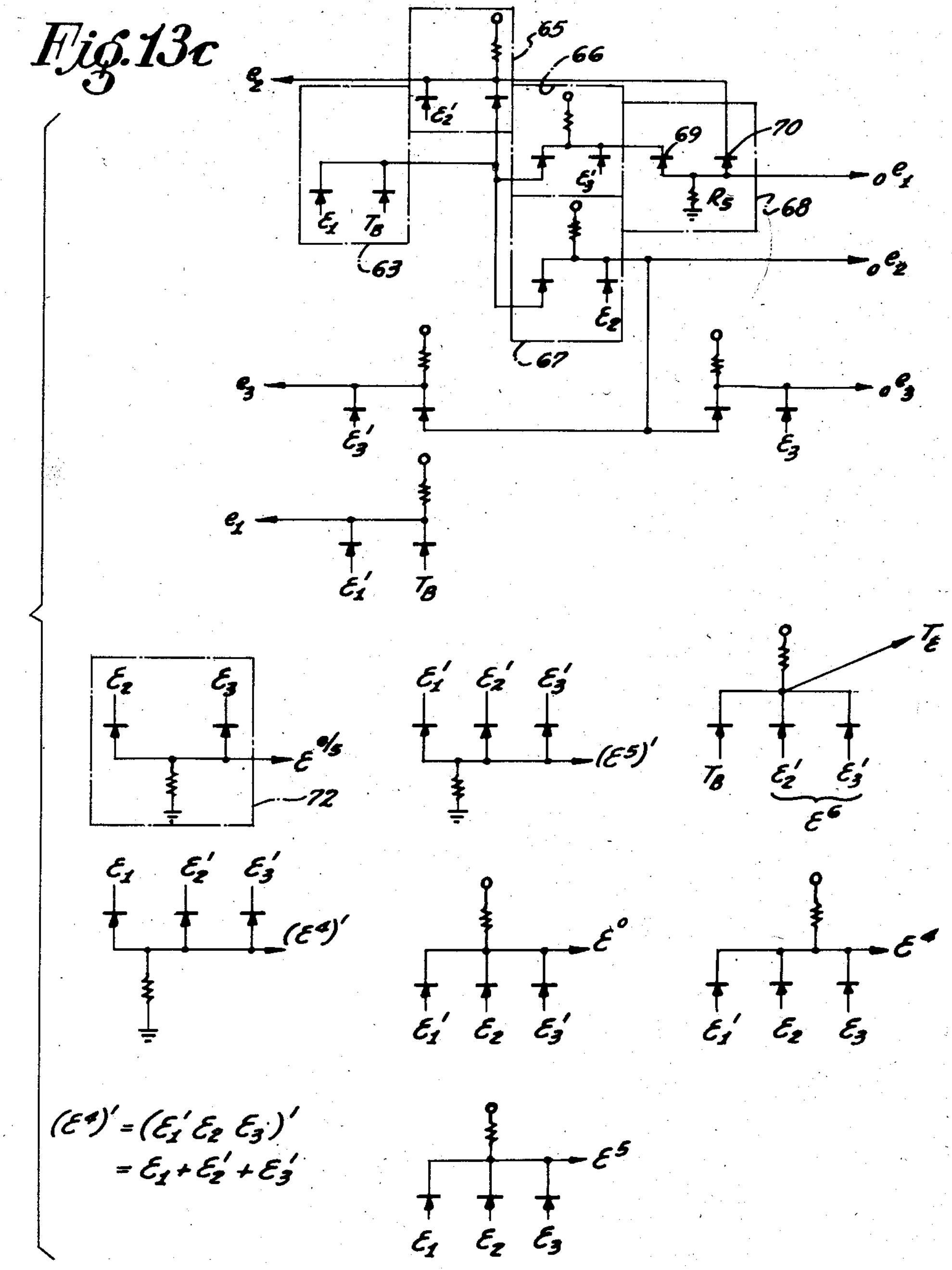

Figure 13c is a schematic circuit diagram of the counting logical net and digit output logical net for the E counter.

Figure 14a is a block diagram of the F parallel counter together with the logical equations defining the triggering inputs for each of its flip-flop stages.

Figure 14b is a table of the states of the flip-flop stages characteristic of the number content of the F counter.

Figure 14c is a schematic circuit diagram of the counting logical net and digit output logical net for the F counter.

Figure 15a is a block diagram of the G parallel counter together with the logical equations defining the triggering inputs for each of its flip-flop stages.

Figure 15b is a table of the states of the flip-flop stages characteristic of the number content of the G counter.

Figure 15c is a schematic circuit diagram of the counting logical net and digit output logical net for the G counter.

Figure 16:
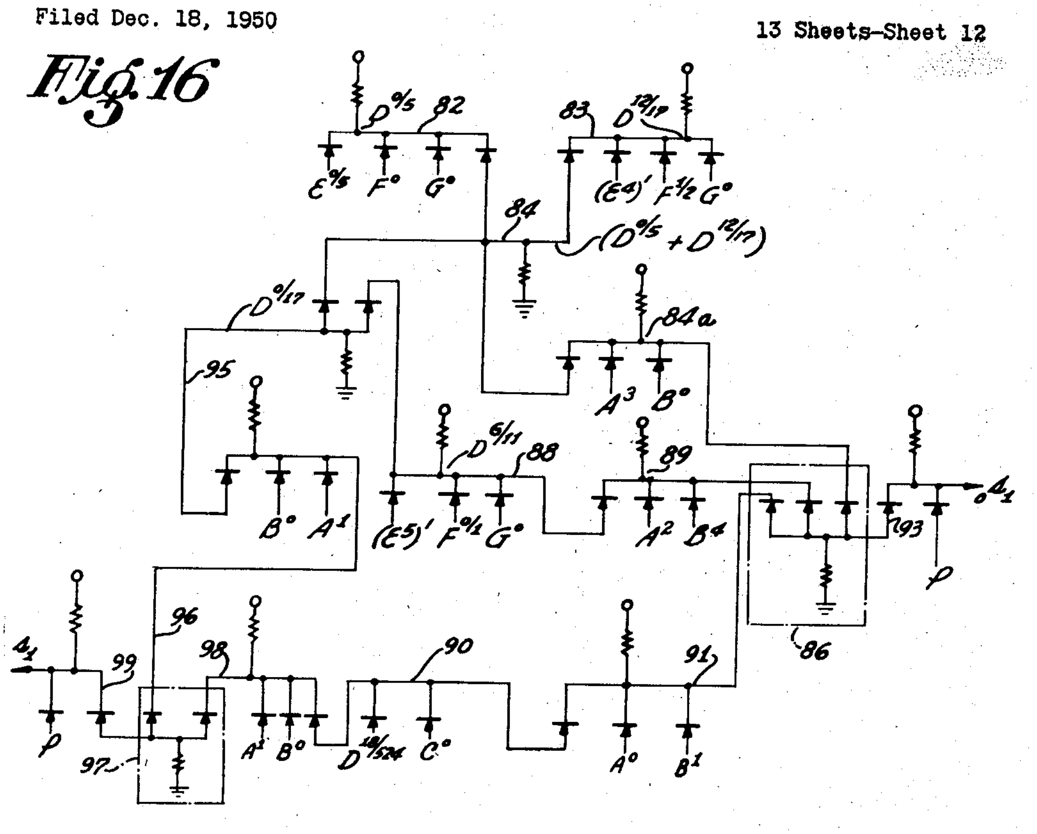

Figure 16 is a logical net for generating the triggering inputs to the sync flip-flop.

Figure 17:
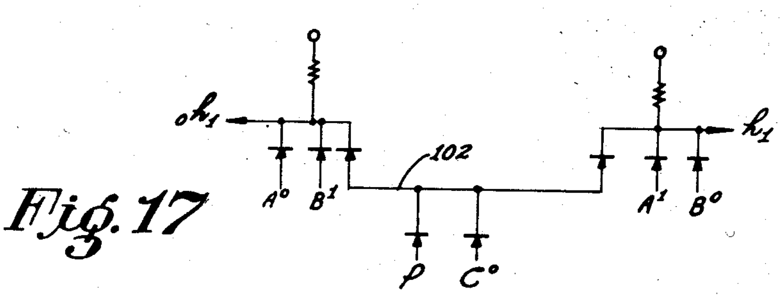

Figure 17 is a logical net for generating the triggering inputs to the horizontal drive flip-flop.

Figure 18:
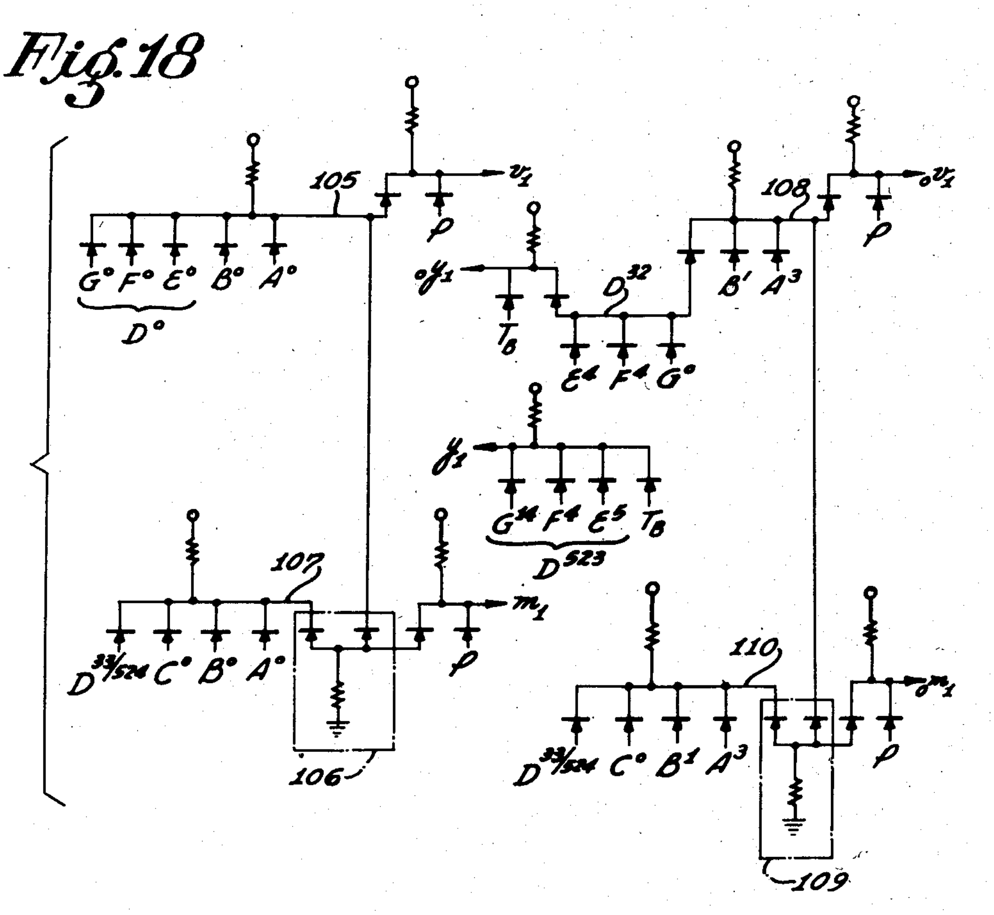

Figure 18 is a logical net for generating the triggering inputs to the vertical drive, mixed blanking, and the counting interval flip-flops.

Figure 1:
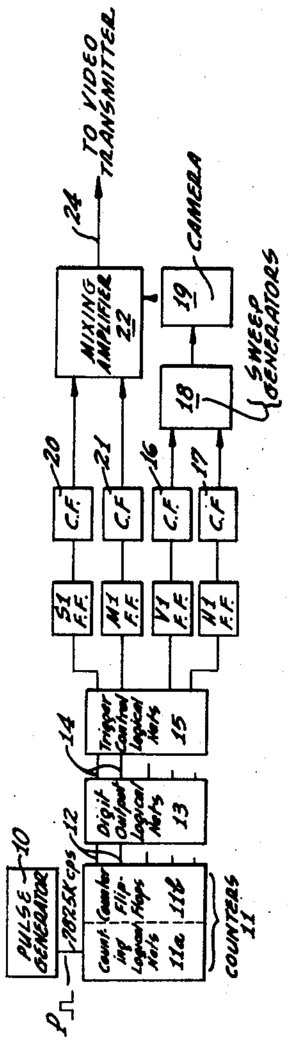

Referring first to Figure 1, a general block diagram is shown of the preferred embodiment of the synchronizing generator of the present invention along with associated equipment as required for a television system.

Here a pulse generator 10 emits square wave pulses P at a fixed rate of 787.5 kc. s. into a cascade of counters 11. Counters 11 are comprised in the main of counting logical nets 11a controlling the states of counting flip-flops 11b. In order to provide certain digit contents of counters 11, corresponding to the leading and trailing edges of the rectangular pulses to be formed, the states of the counter flip-flops 11b, as sensed on outputs 12, are fed into a digit output logical network 13 where they are combined such that each of the lines 14 therefrom, when energized, corresponds to a specific digit, or range of digits.

The signals corresponding to these digit outputs are then further combined in a logical network 15 to form triggering signals which control the change in states of the sync flip-flop S1, the mixed blanking flip-flop M1, the vertical drive flip-flop V1, and the horizontal drive flip-flop H1. The voltage waveform outputs from the vertical drive flip-flop V1 and the horizontal drive flip-flop H1 are fed through a first pair of cathode followers 16 and 17, respectively, to the sweep generators 18 which control the scanning of camera 19. The waveform outputs from the sync flip-flop S1 and the mixed blanking flip-flop M1, on the other hand, are fed through a second pair of cathode followers 20 and 21, respectively, to the mixing amplifier 22 where they are combined with the video signal from camera 19. The composite output signal from the mixing amplifier 22 is sent to a video transmitter (not shown) via video output line 24.

In Figures 2a, 2b, 2c, and 2d the conventional waveforms desired to be generated by means of output flip-flops S1, M1, V1, and H1 are shown. It should be noted that the output pulses all have the same amplitude but differ in pulse width or waveform. The desired amplitude is obtained by means of the cathode followers associated with each of the flip-flops.

The sync pulse generated by flip-flop S1 is the most complex waveform and will be described first. As is well known, the function of this waveform is to keep the receiver locked in with the transmitter scanning by maintaining correct timing of the vertical and horizontal scanning motions.

According to present television practice, 30 frames of a picture are transmitted per second. Each frame is comprised of 525 horizontal scanning lines, the odd numbered lines of which are presented in one field followed by a second field made up of the even numbered lines. Since there are two fields per frame, this sets the vertical synchronizing pulse frequency needed to synchronize the fields at 60 cycles per second, and the horizontal synchronizing pulse frequency needed to synchronize each horizontal line at 15,750 cycles per second.

In the present invention the single timing pulse source 10, having a frequency output of 787.5 kc. s., is employed for driving all the circuits. Thus it follows that a count of 26,250 pulses fed from timing source represents 1/30 of a second or one frame.

Figure 3 is a table showing counts in columns 30 and 31 defining the leading and trailing edges respectively, of the rectangular pulses generated by the sync flip-flop S1 during one frame. By making the capacity of the counters 26250, these counts are repeated every 1/30 of a second to provide the succeeding frame sync pulses.

Figure 2A:
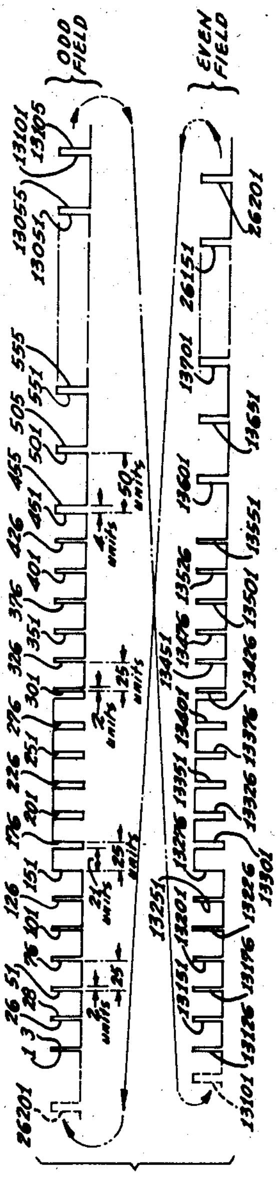

As is apparent from the drawings, the counts in columns 30 and 31 correspond to the numbers assigned to the pulse edges of the waveforms shown in Figure 2*a*.

As seen in the table of Figure 3, of the 26250 count which defines one frame, the first half, 1 through 13125 represents the odd field interval; and the second half, 13126 through 26250 represents the even field interval.

As will be noted, the counters reset to 0 at the 26250 timing pulse count and hence count 26250 does not actually exist as such, but rather is defined as the 0 count.

The pulses in each field can be divided broadly into two intervals, the first interval designated by the reference character 28 includes the pulses required for vertical synchronization; and the second interval designated 29 is comprised of the pulses required for horizontal synchronization.

Referring to Figures 2*a* and 3, the pulses required for vertical synchronization as defined by interval 28 in the odd field are the first ones considered. These include a group of six equalizing pulses followed by a prolonged vertical pulse having five serrations, and then six additional equalizing pulses. The horizontal sync interval 29 which follows is composed of a stream of identical pulses which recur at a fixed rate throughout the remainder of the first field. The second field is composed of a similar array of vertical synchronizing pulses followed by the horizontal sync pulses for the remainder of the field.

The leading edges of the sync pulse waveforms will be considered first.

The present invention arbitrarily assigns the 1 count of the counters to the leading edge of the first equalizing pulse in the odd field. The temporal spacing of the leading edges of each of the equalizing pulses in accordance with the present invention figures out to be twenty-five units. This twenty-five unit spacing is the same for the leading edges of the following prolonged vertical pulse and its serrations and also the succeeding equalizing pulses. Hence the 25 unit interval counts, such as 26, 51, 76, etc. through 426, are assigned to the leading edges of these pulses. Starting with number 451, which represents the leading edge of the first horizontal sync pulse, the numbers assigned to the succeeding horizontal sync pulse leading edges are spaced at 50 unit count intervals, such as counts 501, 551, etc. through 13101. At 13126, which is 25 units after the last horizontal sync pulse, the leading edge of the first equalizing pulse for the even field occurs.

For this latter field, as before, the successive pulse leading edges are spaced at 25 unit interval counts such as 13151, 13176, etc. through 13551 which defines the leading edge of the last equalizing pulse. The succeeding horizontal sync pulses are spaced at 50 unit intervals such as 13601, 13651, etc. and this repeats through count 26201 which defines the leading edge of the last pulse in the even field. Fifty pulse counts later, the counters have reset to 0 and count 1 appears again therein, thus starting the cyclical count for the next frame.

Thus it is seen that the leading edges of all the sync pulses are temporally spaced at either 25 or 50 unit counts apart. For purposes of later discussion these temporal spacings will be referred to as half-line and whole-line intervals, respectively.

Referring next to the trailing edge counts of these pulses, it is noted in Figure 2*a* that the width of all the equalizing pulses are two unit counts, hence the trailing edge counts for each of these pulses, which appear in the same row of the table of Figure 3, are noted in column 31 by increasing each of the leading edge counts by two. It is understood that each of the rectangular pulses is considered to be formed at the end of the unit count period assigned to the leading edge and at the end of the unit count period assigned to the trailing edge.

In a like manner, the width of the vertical serrated pulses is shown to be 21 unit counts, hence the trailing edge counts shown in column 31 for these pulses are obtained by adding 21 units to each of the leading edge counts shown in column 30.

As for the horizontal sync pulses, they are four units counts wide, hence the trailing edge counts for these pulses are obtained by adding 4 units to their leading edge counts.

In accordance with conventional practice it should be noted that, whereas the leading edge of the first equalizing pulse of the odd field is spaced a whole line, 50 unit interval count, from the leading edge of the preceding horizontal sync pulse; the leading edge of the first equalizing pulse of the even field is spaced a half-line, or 25 unit interval, from the preceding horizontal sync pulse. On the other hand, the leading edge of the last equalizing pulse for the odd field is followed by a horizontal pulse spaced a half-line interval away, while the leading edge of the last equalizing pulse for the even field is followed by a horizontal sync pulse spaced a whole-line interval away.

Figure 2B:
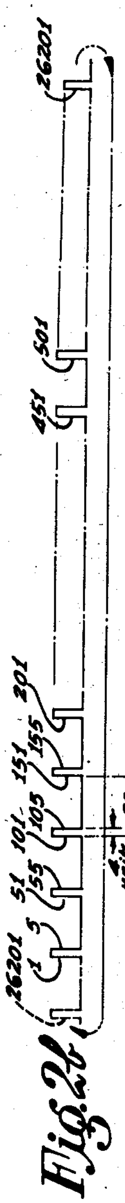

The horizontal drive waveform employed for controlling the camera horizontal line scanning is generated by the H1 flip-flop. This waveform as shown in Figure 2*b* is identical with the horizontal sync pulses (Figure 2*a*), in that pulses, defined by the same leading and trailing edge number counts given to the horizontal sync pulses, such as 451, 501, etc., are found therein. But whereas the horizontal sync pulses were restricted to certain number ranges, the horizontal drive pulses occur continuously at whole line intervals, i. e., every fifty unit counts, throughout a frame.

Figure 2C:
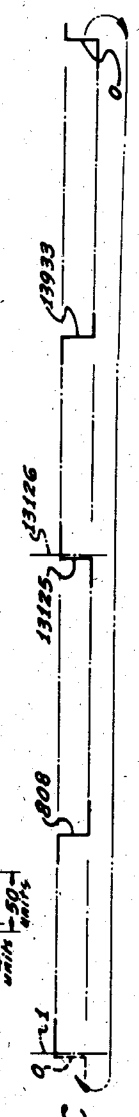

The vertical drive output waveform used for controlling the camera vertical scanning is shown in Figure 2*c*. These vertical drive pulses occur once each field or twice a frame. It should be noted that the leading edges of these rectangular waveforms are one unit earlier than the respective leading edges of the first equalizing pulses in the odd and even fields as shown in Figure 2*a*. Hence the leading edges of the first vertical drive pulse is assigned count 0, and the leading edge of the second is assigned count 13125. The trailing edge of these waveforms which is not critical, has been arbitrarily set at counts 808 and 13933, respectively, since as will be noted, these counts most readily adapt themselves to the counts of the blanking pulses to be next discussed.

Considering next the table in Figure 4, the leading and trailing edge counts of the mixed blanking waveforms are shown in columns 33 and 34 thereof, respectively.

As is well known the function of this waveform is to blank out the signal picked up by the camera scanning beam during the vertical and horizontal retrace time.

This waveform (Fig. 2*d*) is composed of the vertical drive output waveform shown in Figure 2*c* together with a stream of horizontal blanking pulses inserted therebetween. Referring to the table in Figure 4, the leading edges of the vertical blanking pulses are assigned numbers 0 and 13125, and the trailing edges thereof are assigned numbers 808 and 13933, these edge counts being identical to those for the vertical drive waveforms.

Figure 2D:
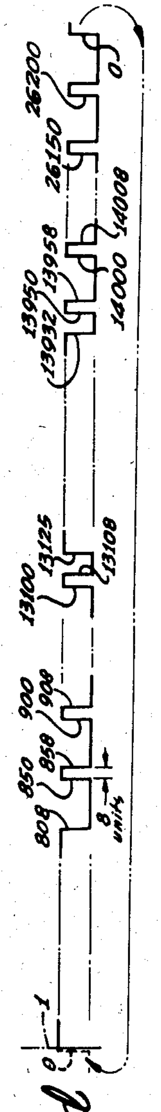

On examining the horizontal blanking pulses, it is noted that the leading edge of each of the horizontal blanking pulses occur one unit pulse time earlier than a corresponding horizontal sync pulse. Note for example, horizontal sync pulse leading edge count 13101 (Figure 2*a*), as compared to horizontal blanking pulse leading edge count 13100 (Figure 2*d*). In addition it is noted that the latter pulse is twice as wide as the former, i. e., 8 unit counts instead of 4. Thus the trailing edge of each of the horizontal blanking pulses, as shown in column 34 of Figure 4, is defined by the leading edge content thereof in column 33 increased by eight units.

Referring back to the table of Figure 3, the basic repetitive counting interval for the leading edge of the waveforms is 25 units which is equal to a half-line interval. This indicates that a 25 unit cycle counter would be desirable to give digital output lines which are energized every 25 unit counts.

To obtain a simple 25 unit counter a radix five counter A is provided which feeds its output into a second radix five counter B. The output from the second counter B is then fed into a D counter considered to have a radix of 525. This arrangement of counters is shown in Figure 5.

In addition a counter C which is likewise actuated by the carry from the B counter is employed for keeping track of the half-lines, i. e., whether the half-line counted by carry from counters A and B is the first or last half-line of a whole line interval.

In order to determine the digit lines of these counters required to sense the leading and trailing edge counts previously recorded in columns 30 and 31 of the table in Figure 3, these counts are converted into the non-uniform radix number represented in particular by counters A, B, and D.

To find the digit contents in these counters equivalent to the counts shown in columns 30 and 31, it is noted that every time the B counter counts to capacity a carry pulse corresponding to a twenty-five unit count is fed into the D counter, increasing this latter counter by one unit. Thus, for example, after the initial 25 unit count from pulse generator 10, the D counter has a 1 therein and on the receipt of the next pulse from pulse generator 10, corresponding to unit count 26, counter A is made to contain a 1. Thus leading edge count 26 is represented by a digit 1 in counter A, digit 0 in counter B, and digit 1 in counter D. In a similar manner, all the leading and trailing edge counts are converted to a non-uniform radix number, so to say, as represented by digits in counters A, B, and D.

After the D counter has recorded 524 twenty-five unit counts, or half lines, the next carry therein from counter B resets the D counter to 0. Thus it is noted that the D counter resets to 0 at the end of each field.

The leading and trailing edge counts of the blanking pulses shown in the table in Figure 4 are in a similar manner converted into digits represented by counters A, B and D.

Referring to Figure 5, the A, B and D counters are shown together with the particular digit output lines therefrom required to make up the leading and trailing edge counts of the waves shown in Figures 3 and 4.

The convention used for indicating the digits associated with a particular counter is to affix a superscript denoting the digit to the capital letter assigned to the counter.

Referring to the A and B counter columns in Figures 3 and 4 it is noted that the A counter digits to be sensed are $A^0$, $A^1$, $A^2$ and $A^3$; and the digits required to be sensed from the B counter are $B^0$, $B^1$ and $B^4$.

Referring next to the D counter, as will be made clearer later, the only single digit outputs needed are $D^0$, $D^{32}$ and $D^{523}$. In addition, three digits or time interval outputs are needed. First interval $D^{0/5}$ is provided since it defines the first group of equalizing pulses (see Figure 3), then interval $D^{6/11}$ is provided to define the serrated vertical pulses, and finally interval $D^{12/17}$ is provided to define the second group of equalizing pulses. It should be noted that these time intervals define the vertical sync pulses for both the odd and even fields of a frame.

As further shown in Figure 3, in order to break up a field interval into the period 28 when the vertical sync pulses are generated and the period 29 when the horizontal sync pulses are generated, the counting intervals $D^{0/17}$ and $D^{18/524}$ are needed. The interval $D^{0/17}$ is obtained by combining the digital output lines representing $D^{0/5}$, $D^{6/11}$ and $D^{12/17}$ in a logical sum circuit 35 whose output line represents $D^{0/17}$. As for the output $D^{18/524}$, since this is a proposition which is true when proposition $D^{0/17}$ is false, the voltage line $D^{0/17}$ is inverted in a tube inverter 36 to obtain voltage line $D^{18/524}$.

To define the whole-line intervals, as required for the horizontal sync pulse, as contrasted to the half-line intervals required for the vertical sync pulses, a $C^0$ digit output line is provided from the C counter.

The general logical method of circuit design utilized in the present invention for the counters and associated circuitry will next be considered.

This method utilizes the correspondence between propositions and methods of symbolic logic, and the two valued nature of electrical quantities in impulse work.

In general when a voltage has two possible values, high or low, it can be used to describe the state of a proposition of symbolic logic which itself has two possible values, true and false; or, as referred to in terms of counting, one and zero.

Propositions are represented in the present invention by flip-flops. When a given proposition is "true" the flip-flop is in one of its states, and when "false" in the other state.

In accordance with the present invention it is desired to have both the "true" and "false" states of the proposition flip-flop capable of being sensed as a relatively high voltage. Hence, output lines are connected to each of the plates of the flip-flop. Likewise it is desirable to be able to trigger a proposition flip-flop to either its true or false state by separate input lines, hence, an input line is connected to each of its grids.

In the present invention combinations of capital letters and numbers are used for designating the proposition flip-flops themselves. The outputs of the flip-flops are characterized by corresponding capital letters with an appropriate subscript. Since one of the outputs corresponds to the flip-flop proposition being true and the other corresponds to the proposition being false, the latter is distinguished from the former by an affixed prime.

On the other hand, the inputs to a flip-flop are designated by corresponding lower case letters with an appropriate subscript. The input for rendering a flip-flop false being further characterized by a sub-zero preceding the lower case letter.

As will be seen, each of the input leads to a proposition flip-flop can be represented by a logical algebra equation. This equation is made up of states of flip-flop propositions (either true or false) which logically govern this input.

Taking the equation which represents the input to a given proposition flip-flop to make it true, for example, the various terms, which represent the true or false states of the governing proposition, are related either by logical multiplication or logical summation operations. By use of logical nets, to be described, these equations are physically solved. The solution being represented by a relatively high voltage level on a single wire. By connecting this wire to the right input of the flip-flop, the validity of the proposition is automatically determined by the state of the flip-flop.

Referring next to Figure 6*a*, a detailed schematic circuit diagram is shown of a typical well-known flip-flop circuit used for representing the propositions of the present invention.

The flip-flop circuit here shown comprises two triodes $V_1$ and $V_2$. The plate of each triode is intercoupled to the grid of the other by a resistor R in parallel with a capacitor C. The plates of each of the triodes are connected through separate load resistors, like resistor $R_1$ to a positive D. C. source +B, and the cathodes of the triodes are grounded. The grids of the tubes are joined through separate grid resistors $R_2$ to a negative bias −E. The flip-flop circuit is provided with triggering circuits associated with each of its grids and output circuits connected to each of its plates.

Whenever a flip-flop is considered to be in a "one" state, neon light L, connected in series with a limiting resistor $R_0$ across the left load resistor $R_1$, lights up; and when the flip-flop is in a "zero" state, neon light L is out.

Thus it is when tube $V_1$ is in the conductive state that the voltage drop across its plate load resistor $R_1$ enables the neon light L to become energized. A "one" state of the flip-flop is thus indicative of tube $V_1$ being in a conductive state and tube $V_2$ in a non-conductive state. Referring to the outputs from the flip-flop circuit, the "one" state of the flip-flop is characterized by a high voltage on the output connected to the plate of the $V_2$ tube simultaneously with a relatively low voltage on the output connected to the plate of the $V_1$ tube. The "zero" state is characterized by opposite voltage levels on the plate outputs.

The circuitry connections for the flip-flops here shown are the ones required for the single stage which comprises the C counter.

The output lines $C_1$ and $C_1'$ from the flip-flop are taken from the right and left plates respectively. In order to maintain the swing of the plate voltage between voltage levels $E_h$ and $E_L$, clamping diodes, such as diodes 32*a* and 32*b* associated with the right output $C_1$, are provided on each of the output lines.

This counter flip-flop keeps track of the half-line counts. Every time a transfer pulse is fed from the B counter the C1 flip-flop changes state. This is accomplished by gate circuits 37 and 38 coupled to the left and right grids of the flip-flop respectively. For example, the left gate circuit 37 is coupled by differentiating circuit 39 and attenuating diode 40 to the left grid. For this particular counting stage, the right plate output $C_1$ is connected to one input of the left gate 37; and the left plate output $C_1'$ is connected to one input of the right gate circuit 38. The input transfer pulse $T_B$ from counter B is applied simultaneously to the second inputs of each of the left and right gate circuits 37 and 38.

As will be seen from the following part of the descriptions, these gate circuits are typical logical product diode nets. In such a circuit, as noted in particular for left gate 37, the inputs therein are applied on the cathode-ends of diodes 41 and 42 whose plate ends are joined to a common line 43 which is connected to a positive source through a load resistor $R_3$.

Any time the plate input to a gate circuit is high in potential, the transfer pulse $T_B$ applied to the other input is, in effect, passed to the output due to the termination of the current flow through resistor $R_3$. This pulse is differentiated in differentiating circuit 39 and the positive portion thereof is dissipated in attenuating diode 40 while the negative portion is passed therethrough and thus triggers the tube off.

In Figure 6*b*, the graphs of the waveforms appearing at different points of the C1 counting stage circuit, above described, are shown. In line I the regularly recurring transfer pulses $T_B$ are shown; in line II the $C_1$ plate output is shown to be initially of a high voltage; while in line III the $C_1'$ plate output is shown to be initially of a low voltage. As shown in line IV, whenever both the waveforms $C_1$ and $T_B$ are relatively high in potential, the term $_0c_1$ is considered to pass through the gating circuit as a rectangular pulse similar in waveform to the transfer pulse $T_B$. In line V the pulse form impressed on the input to the left grid is shown to be essentially the differentiated trailing edge 51*a* of the rectangular pulse $_0c_1$. It is thus noted that the flip-flop changes state on the trailing edge of the $_0c_1$ (or transfer pulse $T_B$). It is also noted that as a result of triggering the left tube off the left plate is now high in potential so that on occurrence of the next transfer pulse $T_B$, the right gate, in effect, allows the transfer pulse to pass therethrough and hence the differentiated trailing edge 51*b* of this latter pulse triggers the flip-flop back to its original state.

Below the C1 flip-flop circuit in Figure 6*a* the coincidence of waveforms at the gates is signified, using symbolic logic notation, by a product equation. When the terms of such an equation are all high in potential the trigger proposition represented by the equation is considered to be effective. Thus the equation which defines when the C1 flip-flop is to be made "true" is $c_1 = C_1'T_B$.

and the equation which defines when the C1 flip-flop is to be made "false" is ${}_0c_1 = C_1 T_B$.

The equations for the inputs to the proposition flip-flops are thus a useful key revealing the manner in which the outputs of the flip-flops are interconnected to the inputs.

Referring next to Figures 7*a* through 7*d*, the output flip-flops S1, H1, V1 and M1, respectively, are shown. These flip-flops are all similar to the one shown in Figure 6*a* and so they are shown in a simplified manner, indicating mainly the plate output line and the gating circuit to each of the inputs.

Referring first to flip-flop S1, the right output plate line S1 only is required. However, both triggering inputs are required. These are represented herein by right and left gates 45 and 46 controlled by propositions represented by the equations shown below the flip-flop circuit. These equations are obtained in particular by reference to the table in Figure 3. It was previously noted that the timing of the leading edges of the vertical sync pulses generated by the S1 flip-flop are denoted by digits $B^0$ and $A^1$ in the B and A counters respectively during the digit interval $D^{0/17}$ in the D counter. This is represented in symbolic notation by the logical product $D^{0/17}B^0A^1$. As for the leading edges of the horizontal sync pulses, they are represented by digits $C^0$, $B^0$ and $A^1$ in the C, B, and A counters respectively during the digit interval $D^{18/524}$ in the D counter. These latter leading edges are symbolically notated by logical product $$D^{18/524}C^0B^0A^1$$

Thus the $s_1$ triggering equation which makes the $S_1$ output high can be expressed by logically summing the above two logical products.

$$s_1 = \{D^{0/17}B^0A^1 + D^{18/524}C^0B^0A^1\}P$$

The plus sign is used for indicating logical summation, known also as the "inclusive or" operation. Since all changes in the waveforms are to be synchronized with the trailing edge of the timing pulse P, coincidence of this latter pulse is also required at each of the gates as noted by the term P which multiplies the logical sum to complete the equation.

As for the trailing edges of the sync waveform, it is noted that the trailing edges of the equalizing pulses are defined by digits $B^0$ and $A^3$ in the B and A counters during time intervals $D^{0/5}$ and $D^{12/17}$ defined by the D counter; the trailing edges of the vertical serrated pulses are defined by digits $B^4$ and $A^2$ in the B and A counters during the interval $D^{6/11}$ of the D counter; and the trailing edges of the horizontal sync pulses are defined by digits $C^0$, $B^1$ and $A^0$ during time interval $D^{18/524}$. Hence the ${}_0s_1$ triggering equation is denoted by the logical equation:

$${}_0s_1 = \{(D^{0/5} + D^{12/17})B^0A^3 + D^{6/11}B^4A^2 + D^{18/524}C^0B^1A^0\}P$$

Referring next to Figure 7*b*, the horizontal drive flip-flop H1 is schematically illustrated along with its input triggering logical equations. Since the horizontal drive pulses are similar to the horizontal sync pulses, the equations are as follows:

$$h_1 = C^0B^0A^1P$$
$${}_0h_1 = C^0B^1A^0P$$

Note that the counts are exactly the same as the latter portion of the S1 input equations except that no restriction is imposed by the D counter, since the horizontal drive pulses occur continuously.

In Figure 7*c*, the vertical drive flip-flop V1 is schematically depicted. The triggering input equations therefore are as follows:

$$v_1 = D^0B^0A^0P$$
$${}_0v_1 = D^{32}B^1A^3P$$

In Figure 7*d*, the mixing blanking flip-flop M1 is schematically illustrated. By reference to the table in Figure 4 and the previous discussion, the leading edges of the output wave therefrom, i. e., the $m_1$ input which triggers the flip-flop so that its output is high in potential is expressed as:

$$m_1 = \{D^0B^0A^0 + D^{33/524}C^0B^0A^0\}P$$

The trailing edges of the output wave therefrom, i. e., the ${}_0m_1$ input which triggers the flip-flop so that its output is low in potential is expressed as:

$${}_0m_1 = \{D^{32}B^1A^3 + D^{33/524}C^0B^1A^3\}P$$

In Figure 8, a block diagram is shown of the Y1 flip-flop which generates the D counter interval $D^{33/524}$. As previously noted this time interval is needed to define the interval during which the horizontal blanking pulses are generated. As seen below this flip-flop, the left flip-flop input gate opened at count $D^{32}$ thus permitting the next $T_B$ pulse, corresponding to count $D^{33}$, to trigger the left output to a high potential. On the other hand the right flip-flop input gate opened at count $D^{523}$ thus permitting the next $T_B$ pulse, corresponding to the $D^{524}$ count, to trigger the left output to a low potential.

It should be noted that in triggering the Y1 flip-flop there is a one $T_B$ pulse delay between the time the applied $D^{32}$ term reaches a high potential and the left plate output line $D^{33/524}$ reaches a high potential, in that it is the trailing edge of the next $T_B$ pulse after the $D^{32}$ term becomes high that triggers the flip-flop.

Referring next to Figure 9*a*, the proposition flip-flops A1, A2, and A3, comprising the stages of the A counter are schematically illustrated.

Below the flip-flops the logical equations describe how the outputs of the flip-flops are connected to the inputs to cause the A counter to count through a cycle of five consecutive digits, i. e., have a radix of five.

The counter arrangement is a parallel one in that the P pulses from the pulse generator 10 are applied on all the flip-flop inputs simultaneously. The interconnections of the flip-flop outputs, however, only allow certain flip-flops to be triggered by the successive P pulses so as to change their states in an orderly fashion to indicate the successive digit outputs.

In Figure 9*b* the combinations of the states of the flip-flops which indicate the digital content of the counter are shown by a table. This table is a binary representation of the digits 0 through 4, herein designated $A^0$ through $A^4$.

The connections of the outputs of the flip-flops to the right input of a particular flip-flop, i. e., the input which when triggered will make the flip-flop in question true, are determined by examining the states of all the flip-flops whenever the flip-flop in question is to change from a "zero" to a "one"; and the connections of the outputs of the flip-flops to the left input of a particular flip-flop, i. e., the input which renders the flip-flop false, are determined by examining the states of all the flip-flops whenever the flip-flop in question is to change from a "one" to a "zero."

The coincidence of these flip-flop states are then represented as logical products made up of the terms representing the flip-flop outputs. For example, examine the flip-flop states when it is desired to make flip-flop A1 true, i. e., have a 1 therein on occurrence of the next P pulse. This occurs when changing from digits $A^0$ to $A^1$ and $A^2$ to $A^3$. It is noted that a sufficient condition is that flip-flops A1 and A3 are both necessarily indicating a 0 state at the same time. Hence, the equation $a_1=A_1'A_3'P$. Likewise a sufficient condition necessary to make flip-flop A1 false, i. e., record a 0 therein on occurrence of the next P pulse, is that flip-flop A1 be in a true state. Thus it follows that $_0a_1=A_1P$.

In a similar manner the conditions necessary to make flip-flop A2 true are that flip-flop A1 be in a true state and flip-flop A2, itself, be in a false state as symbolically noted by $a_2=A_1A_2'P$. To make flip-flop A2 false, flip-flops A1 and A2 must be simultaneously recording a one, i. e., $_0a_2=A_1A_2P$.

It is noted that this latter condition which makes flip-flop A2 false is also the one required to make flip-flop A3 true; hence $a_3=A_1A_2P$. As for the left input of the A3 flip-flop, a sufficient condition required to make flip-flop A3 false is that it be previously true. Thus $_0a_3=A_3P$.

Referring next to Figure 9*c*, the logical diode nets required to physically solve these triggering equations are shown.

The solution of $_0a_1=A_1P$ will first be described. To solve this equation, a logical product of terms $A_1$ and P must be obtained as shown in a typical product circuit 44 which is identical to the gate circuit shown in Figure 6*a*. Here the potentials $A_1$ as obtained from the right plate output of flip-flop A1 and P as obtained from the pulse generator 10 are fed into a pair of input diodes 45*a* and 46*a* having their plates interconnected at junction 47. Junction 47 is then returned to a high potential through a load resistor $R_4$. This circuit is such that whenever either or both of the inputs $A_1$ and P are relatively low in potential, current is drawn from source B+ through resistor $R_4$, thus keeping junction 47 relatively low in potential. However, whenever both inputs are relatively high in potential, the output line 48 is relatively high. The $_0a_1$ equation is considered to be solved when this output line 48 is high in potential.

Output $a_2$ is seen to be a product of the same terms defining $_0a_1$ multiplied by an additional term $A_2'$. It should be noted that instead of providing a three input product circuit for solving the $a_2$ equation, the output of the two input product circuit 44 is cascaded into one of the inputs of a second two input product circuit 49 along with the new term $A_2'$. Thus the output 50 of the second two input product circuit 49 generates the $a_2$ solution.

The output equations $_0a_2$ and $a_3$ are identical and also include therein the common product defining $_0a_1$. Hence the output of the two input product circuit 44 is also fed as one of the inputs 51 into a third two input product circuit 52 along with the new term $A_2$. The output of this third product circuit 52 provides both $_0a_2$ and $a_3$.

The $a_1$ term which is equal to $A_1'A_3'P$ is generated as an output from multiplication circuit 56. As will be shortly described, the partial product of terms $A_1'$ and $A_3'$ occurs again in the digital output diode net. Hence these two terms are fed through diodes 53 and 54 to a common line 55. However, since this partial product is not used as an output as such, or, as will be shortly described, as an input to a logical addition circuit, no resistor return to potential source B+ is supplied for common line 55. Instead the output of common line 55 is combined with the term P in multiplication circuit 56 to generate $a_1$ at its output.

The $_0a_3$ triggering solution is obtained by multiplying terms $A_3$ and P in a separate product network 58. It should be noted that the overflow from the A counter feeds the B counter. Hence the diagonal output line 59 from product network 58 also generates this transfer term $T_A$.

The logical net to generate the digital outputs required from the A counter as noted in Figure 5 will next be described. As shown in Figure 9*b*, digit output $A^2$ is comprised of a logical product made up of the false states of flip-flops A1 and A3 together with the true state of flip-flop A2. The partial product $A_1'A_3'$ was previously generated on common line 55. Hence the voltage on this line along with the term $A_2$ is fed into a first logical product circuit 60 to generate digit output line $A^2$. Digit line $A^0$ is likewise obtained by a product comprised of partial product $A_1'A_3'$ as obtained from common line 55 multiplied by the term $A_2'$ in a second logical product circuit 61. The digit output line $A^1$ is made up of terms $A_1$, $A_2'$, $A_3'$ combined in a separate three input product circuit 62. The digit output line $A^3$, which is the last one needed, is made up of a separate product circuit comprised of terms $A_1$ $A_2$, as shown.

In Figures 10*a*, 10*b* and 10*c*, the counter B is shown. The arrangement of this counter is identical to that for counter A, except that the flip-flops are herein designated B1, B2, B3; and the input to the counter which is the carry from counter A is designated $T_A$ which is in itself equal to the product $A_3P$ (see Figure 9*c*). The combinations of the states of the B flip-flops representing their digital count are the same as in counter A; and hence the interconnections, as represented by the input equations, as well as the arrangement of the counter diode net, are the same. In this case, however, the digit outputs provided by the digit output logical net are only $B^0$, $B^1$ and $B^4$. The transfer pulse $T_B$ from the B counter which is comprised of the product of terms $T_A$ and $B_3$ is generated on line 57.

Figure 11 shows the general breakdown of the D counter. It should be noted that in order to obtain a simple counter having a radix of 525, this counter is actually composed of a cascade of counters E, F, and G.

The conversion of the D digit outputs, required as shown in Figure 5, to the E, F, G digit outputs, is indicated in Figure 12. There it is shown that counter E has a radix 7 whose output cascades into counter F having a radix 5, and the output of counter F cascades into counter G having a radix of 15. It is now apparent that just as the A and B counter digits when taken together give a radix 25 counter, the E, F and G counter digits when combined give a radix 525 counter.

Three digit propositions and three interval propositions are required from this table (Figure 12) in order to define the D digit and interval outputs shown in Figure 5.

The three digit propositions, as expressed in symbolic notation, are obtained directly from the contents of the counters. Thus:

$$D^0=G^0F^0E^0,\quad D^{32}=G^0F^4E^4,\quad D^{523}=G^{14}F^4E^5$$

During the interval propositions $D^{0/5}$, the E counter is seen to count from digits $E^0$ through $E^5$ while the F and G counters are always zero. Hence $$D^{0/5}=G^0F^0E^{0/5}$$

For interval proposition $D^{6/11}$, all the digits in the E counter but $E^5$ are required; that is, $$(E^{0/4}+E^6)$$

This condition can be sensed by term $(E^5)'$ which is the inverse of the $E^5$ digit and logically means all E digits but $E^5$. In addition, the digit interval $F^{0/1}$ is required in the F counter and digit $G^0$ from the G counter.

Thus: $D^{6/11}=G^0F^{0/1}(E^5)'$.

For interval proposition $D^{12/17}$, all the E digits but digit $E^4$ are required; that is, $(E^{0/3}+E^{5/6})$. This condition can be sensed by term $(E^4)'$ which is the inverse of the $E^4$ digit proposition. In addition, the digit interval $F^{1/2}$ is required from the F counter and digit $G^0$ from the G counter. Thus $D^{12/17}=G^0F^{1/2}(E^4)'$.

On examining the above propositions, it is found that the digit outputs that must be sensed from the E counter are $E^0$, $E^{0/5}$, $E^4$, $E^5$, $(E^4)'$ and $(E^5)'$. The digit outputs required from the F counter are $F^0$, $F^{0/1}$, $F^{1/2}$ and $F^4$; while digit outputs $G^0$ and $G^{14}$ are required from the G counter. These outputs are obtained from their respective counters as shown in Figure 11.

Referring next to Figures 13*a*, 13*b* and 13*c*, the E counter flip-flops and counter logical nets are described.

As with the A and B counters, the manner of interconnecting the flip-flops E1, E2 and E3 to have together a cycle of seven stable states, $E^0$ through $E^6$, is obtained by inspection of the unique combination of the states of the flip-flops assigned to each of the digits. Hence, using the information in Table 13*b*, the triggering inputs to the flip-flops can be written using symbolic logic notation as described in connection with the previous counters.

It should be noted that trigger input $_0e_1$, the input which renders the E1 flip-flop to be false, is defined by the equation $_0e_1=E_1(E_2'+E_3')T_B$. That is to say, the condition needed to trigger the flip-flop E1 to a false state is a true state of flip-flop E1 and a false state of either flip-flop E2 or E3, or both. This condition is required because when going from digit $E^5$ to $E^6$ it is desired to inhibit the E1 flip-flop from changing to a false state. This change is characterized by a true state in both the E2 and E3 flip-flop which is excluded by the equation.

The logical diode nets for physically solving the trigger inputs to the E counter flip-flops are shown in Figure 13*c*. The first step in obtaining output $_0e_1$ is to multiply, in effect, terms E1 and $T_B$ in a first circuit 63. As noted before, no resistor return to potential source B+ is needed in circuit 63, since it represents a partial product. The output from circuit 63 is then conveyed in parallel into: a first multiplier network 65 along with term $E_2'$, to generate $e_2$; a second multiplier network 67 along with term $E_2$ to generate $_0e_2$; and a third multiplier network 66 along with term $E_3'$. The outputs from the first and third multiplier network 65 and 66, respectively, are then fed into a typical logical addition circuit 68. This circuit 68 is comprised of a pair of input diodes 69 and 70 whose cathodes are joined and returned to ground through a common resistor $R_5$. When either one, or both, of the inputs to logical addition circuit 68 is relatively high in potential, current flow through resistor $R_5$ raises addition output line $_0e_1$ to a relatively high potential indicative of the logical sum.

The diode networks provided for solving the remaining trigger equations are evident from the previous description and will not be further described.

The logical nets for the digital outputs required from the E counter, as shown in Figure 11, are presented in the lower portion of Figure 13*c*, and their arrangements obtained by inspection of the flip-flop states associated with each of the E digits as shown in Figure 13*b*.

Here it is noted that interval $E^{0/5}$ is characterized by a high state in either one or both of the E2 and E3 flip-flops. Hence this interval is generated by feeding terms $E_2$ and $E_3$ into a logical summation circuit 72.

The inverse term $(E^4)'$ is noted to be equal to $(E_1'E_2E_3)'$. It can be shown by the rules of logical algebra that:

$$(E_1'E_2E_3)'=E_1+E_2'+E_3'$$

Hence, by feeding each of these terms into a logical summation circuit, the output therefrom represents $(E_4)'$. The logical net for the inverse term $(E_5)'$ is obtained in a similar manner.

The connections for the $E^0$ and $E^4$ and $E^5$ digit output circuits are obtained by direct examination of the table in Figure 13*b*.

The transfer output from counter E, namely, $T_E$, is obtained by multiplying $T_B$ along with voltage terms $E_2'$ and $E_3'$ representing $E^6$.

The F counter, as shown in Figure 14*a*, is a radix 5 counter identical to the A and B counters and will not be further described except for the circuit for the $F^{1/2}$ digit interval output which is obtained as shown in Fig. 14*c* by multiplying terms $F_1$ and $F_2'$ in a first product network 75 and terms $F_1'F_2$ in a second product network 77, and combining the outputs therefrom in a first addition circuit 78 whose output represents the desired term $F^{1/2}$.

The G counter, which is a radix 15 counter, will next be described. In designing parallel counters of this type, when the counting radix begins to get larger, such as in the G counter, the following general scheme of interconnecting the outputs of the flip-flop stages to the inputs can be noted by reference to the binary number table representing the G digits in Figure 15*b*.

There it is seen that all of the flip-flop stages after the first change to a one state when, and only when, the flip-flop in question is in a zero state and all the lower order flip-flops are in a one state. That is to say, a necessary and sufficient condition required for enabling a flip-flop after the first to change to a one state on the next input pulse $T_F$ is for all the lower order flip-flops to indicate a one. Thus, using symbolic notation, the equations for the true grids of the last three flip-flop stages are as follows:

$$g_2=G_1G_2'T_F$$
$$g_3=G_1G_2G_3'T_F$$

and $$G_4=G_1G_2G_3G_4'T_F$$

In a similar manner, a necessary and sufficient condition required for enabling a flip-flop to change to a zero state on the next input pulse $T_F$ is for all the lower order flip-flops, in addition to the flip-flop in question, to be in a one state.

Thus the symbolic equations as applied to the false grids of these flip-flops are as follows:

$${}_0g_2 = G_1G_2T_F$$
$${}_0g_3 = G_1G_2G_3G_F$$
$${}_0g_4 = G_1G_2G_3G_4T_F$$

In general, it can be stated that the first stage flip-flop ordinarily changes state on each application of the $T_F$ pulse. This is true for changing flip-flop G1 to a true state as noted by equation $g_1 = G_1'T_F$. However, in this particular case, it is desired to reset the counter from $G^{14}$ to digit $G^0$. Thus, for this one digit change, the first stage flip-flop must be inhibited from changing its state, i. e., it must remain in the one state. This anomaly is handled by noting that this particular digit change ($G^{14}$ to $G^0$) is characterized by a one in the G2, G3 and G4 flip-flops. At all other times that it is desired to change the state of flip-flop G1 to one, at least one of the flip-flops G2, G3, or G4 are in a zero state. Thus the change of the G1 flip-flop to a false state can be expressed by equation:

$${}_0g_1 = G_1(G_2' + G_3' + G_4')T_F$$

Because of this orderly scheme for the triggering of the counting flip-flops, the physical solution of these trigger equations readily lend themselves to what is referred to as the family tree type of diode logical net.

As seen in Figure 15c, the various triggering inputs are all obtained, except $g_1$, as branches from the main trunk 80 of the diode net. The solutions represented by each of the upper branches include as common terms the solutions represented by each of the lower branches which make up the trunk. The detailed description of the circuit follows from the previous discussion.

Only the digit output circuits $G^0$ and $G^{14}$ shown are needed from the G counter and the arrangement of these circuits are determined from the binary table.

Having described all the counter circuits and the digital output nets therefrom, the physical circuits for solving the trigger equations previously presented for the S1, H1, V1 and M1 flip-flops will next be described.

In Figure 16 the logical diode nets for generating the triggering inputs to the S1 flip-flop are shown. On line 82 and 83 the time intervals $D^{0/5}$ and $D^{12/17}$, respectively, are generated. (See Figure 12.) These two intervals are then added together such that their logical sum is on line 84. This sum is then combined with terms $A^3$ and $B^0$ in a product circuit to form an intermediate product as sensed at point 84a. The potential of this point is fed into one of the three inputs of a final logical summation circuit 86.

Interval $D^{6/11}$ is generated on line 88 and combined with terms $A^2$ and $B^4$ to form a product sensed by the potential at point 89. This point is connected to the second input of the final logical summation circuit 86.

On line 90, the $D^{18/524}$ time interval, as obtained from the inverter 38 (Figure 5), is combined with term $C^0$ to form a partial product. This partial product is cascaded to the right and combined with terms $A^0$ and $B^1$ in a product circuit whose output 91 is connected to the third input of the final logical summation circuit 86.

The output 93 from the final logical summation circuit 86 is then synchronized with a P pulse in a final product circuit to form the solution ${}_0s_1$.

The $D^{6/11}$ interval as represented by the potential at line 88 is further fed into a sum circuit along with sum $(D^{0/5} + D^{12/17})$ as represented by the potential on line 84 to obtain the $D^{0/17}$ interval on line 95. This potential on line 95 is combined with terms $B^0$ and $A^1$ to obtain a product 96 which feeds into one input of a second final addition circuit 97. The other input to final addition circuit 97 is the product 98 of the partial product as evidenced on line 90, and the $A^1$ and $B^0$ terms. The output 99 of second final addition circuit 97 is then synchronized with a P pulse in a second final product circuit whose output represents the $s_1$ solution.

Figure 17 shows the logical net provided for generating the horizontal drive triggering inputs $h_1$ and ${}_0h_1$. The common terms P and $C^0$ are first multiplied together to obtain a partial product as represented by the potential on line 102. This partial product is then cascaded to the right and multiplied by terms $A^1$ and $B^0$ to obtain solution $h_1$, and is cascaded to the left and multiplied by terms $A^0$ and $B^1$ to obtain solution ${}_0h_1$.

Figure 18 is a complex logical net for generating the V1, M1 and Y1 flip-flop triggering inputs. As was previously noted, the leading and trailing edge counts of the vertical drive pulses and the vertical blanking pulses are the same. Hence the potential representing the leading edge counts of these pulses, as obtained on line 105, is connected, on one hand with a P pulse to generate $v_1$, and on the other hand to one of the inputs of a sum circuit 106 required in the $m_1$ network. The leading edge counts of the horizontal blanking waveforms, as generated on line 107, is connected to the other input of the sum circuit 106. The output of sum circuit 106 is then combined with a P pulse to generate the desired $m_1$ solution.

The potential representing the common trailing edge counts of the vertical drive and blanking waveforms, as generated on line 108, is combined on one hand with a P pulse to generate ${}_0v_1$, and on the other hand is connected to one of the inputs of a second sum circuit 109 required in the ${}_0m_1$ network. The trailing edge count of the horizontal blanking waveform, as generated on line 110, is connected to the other input of the second sum circuit 109. The output of second sum circuit 109 after being multiplied by a P term gives the ${}_0m_1$ output.

The diode nets for the Y1 flip-flop trigger propositions are also shown in Figure 18. These circuits are formed from the equations in a similar manner by product circuits and will not be further described.

While the circuits as shown and described herein are admirably adapted to fulfill the features of advantage previously enumerated as desirable, it is to be understood that the invention is not to be limited to the specific features shown, but that the means and construction herein disclosed are susceptible of modification in form, proportions and arrangement of parts without departing from the principle involved or sacrificing any of its advantages, and the invention is therefore claimed in embodiments of various forms all coming within the scope of the claims which follow.

What is claimed is:

1. A synchronizing generator comprising a source of timing pulses, a cascade of counters connected to count pulses from said source, means for establishing potentials representing specific counts in said counters, means for combining said count potentials to form control potentials, a plurality of flip-flop circuits, means for applying said control potentials to said flip-flop circuits to change the state thereof, and output means connected to each of said flip-flop circuits, whereby as said counters are advanced, the flip-flop circuits generate signals on said output means in accordance with the timing of the control potentials applied thereto.

2. In a complex waveform generator, a plurality of counters, each of said counters comprised of a plurality of counting flip-flop circuits and a counting network, a source of timing pulses applied to said counting networks to change the states of said counting flip-flop circuits in a predetermined sequence, an output network associated with said counting flip-flop circuits for establishing potentials representative of the digits of numbers related to leading and trailing edges of the waveforms to be generated, circuit means for combining said digit potentials to establish control potentials representative of said numbers, output flip-flop circuits capable of being triggered from one state to the other, means for applying said control potentials to trigger said output flip-flop circuits, and output lines connected to said output flip-flop circuits having the desired waveform established thereon.

3. Apparatus in accordance with claim 2 wherein said output flip-flop circuits are arranged to be triggered at the coincidence of timing pulses with said control potentials.

4. In a complex waveform generator, a cascade of counters, said counters having non-uniform radices, each of said counters being comprised of a plurality of counting flip-flops, a source of timing pulses, a counting network associated with each of said counters for triggering said counting flip-flops in a predetermined sequence on application of said timing pulses, an output network associated with each of said counters for establishing potentials representative of certain digits, means for combining said digit potentials to establish potentials representative of non-uniform radix numbers corresponding to the counts of the leading and trailing edges of the waveforms to be formed, means for combining said number potentials to establish potentials representative of trigger signals, output flip-flops, means for applying said trigger signals to change the state of said output flip-flops, and output means connected to each of said output flip-flops having the desired waveform established thereon.

5. In a complex waveform generator, a cascade of counters, said counters having non-uniform radices, each of said counters being comprised of a plurality of counting flip-flops, a source of timing pulses, a counting network associated with each of said counters for triggering said counting flip-flops in a predetermined sequence on application of said timing pulses, a digit output network associated with each of said counters for establishing potentials representative of certain digits, means for combining said digit potentials to establish potentials representative of non-uniform radix numbers, means for combining said number potentials to establish potentials representative of trigger signals, an output flip-flop comprised of a pair of tubes, each tube including a grid and a plate, said output flip-flop capable of being triggered from one state to the other by signals applied on said grids, means for applying trigger signals corresponding to the trailing edges of the waveform to be generated on one grid of said output flip-flop, and means for applying trigger signals corresponding to the leading edges of said waveforms on the other grid of said output flip-flop, and output means connected to one of the plates of said output flip-flop having the desired waveform established thereon.

6. A television synchronizing generator for establishing four waveforms comprising a source of timing pulses, a first counter connected to count pulses from said source and having a radix corresponding to the interval of a half-line, a second counter connected to be supplied by transfer pulses from said first counter and having a radix corresponding to the interval of a field, a third counter also connected to be supplied by transfer pulses from said first counter and having a radix of two, output networks associated with said counters for establishing potentials representative of digits corresponding to the leading and trailing edge counts of the waveforms to be generated, means for combining said digit potentials to form control potentials, output flip-flops for each of the waveforms, output conductors connected to each of said flip-flops, and means for applying said control potentials to said output flip-flops to establish one of said waveforms on each of said output conductors.

7. Apparatus in accordance with claim 6 wherein said first and second counters are each comprised of a series of smaller counters whose radices are factors of said respective first and second counters.

8. A television synchronizing generator for generating groups of rectangular waveforms comprising a source of timing pulses, a first counter for counting pulses from said source and having a radix corresponding to the interval of a half-line, a second counter supplied by transfer pulses from said first counter and having a radix corresponding to the interval of a field, a third counter also supplied by transfer pulses from said first counter and having a radix of two, output networks associated with said counters for establishing potentials representative of certain digits corresponding to the leading and trailing edge counts of the groups of waveforms to be generated, control networks for combining said digit potentials to establish separate control signals for the leading edges and the trailing edges of the waveform in a particular group, an output flip-flop for each of the group of waveforms to be generated comprised of a pair of tubes, each tube including a plate and a grid, said flip-flops having trigger circuits associated with each of said grids and an output conductor connected to one of said plates, and means for applying said control signals to the trigger circuits of said output flip-flops whereby the desired waveform is generated on said output conductors.

9. A television synchronizing generator for establishing four complex waveforms comprising a source of timing pulses, a first counter connected to count pulses from said source and having a radix corresponding to the interval of a half-line, a second counter connected to be fed by transfer pulses from said first counter and having a radix corresponding to the interval of a field, a third counter also connected to be fed by the transfer pulse from said first counter and having a radix of two, output networks associated with said counters for establishing potentials representative of digits corresponding to the spacing of leading and trailing edges of the waveforms, means for combining the digit potentials corresponding to the leading edges of each of the waveforms to obtain a first control potential, means for combining the digit potentials corresponding to the trailing edges of each of the waveforms to form a second control potential, output flip-flops capable of being triggered into two stable states for each of the waveforms, an output conductor connected to each of said output flip-flops, and means responsive to said first control potential of a waveform for triggering an output flip-flop into one state and responsive to said second control potential of a waveform for triggering said output flip-flop into the opposite state, whereby the desired waveform is established on the output conductor from said output flip-flop.

10. A synchronizing generator for establishing waveforms comprising a source of timing pulses, a first counter connected to count pulses from said source and having a radix equal to a minor cycle count, a second counter connected to count transfer pulses from said first counter and having a radix equal to a major cycle count, means for establishing potentials from said first counter corresponding to leading and trailing edge counts of pulses recurring every minor cycle, means for establishing potentials from said first and second counters corresponding to leading and trailing edge counts of pulses recurring every major cycle, means for establishing potentials from said second counter corresponding to major cycle counting intervals, means for combining said counting interval potentials with digit potentials from said first counter whereby the minor cycle counts are made effective only during said counting interval of the major cycle, means for combining all the potentials corresponding to the leading edge counts of a waveform to establish a first control potential, means for combining all the potentials corresponding to the trailing edge count of a waveform to establish a second control potential, an output flip-flop capable of being triggered into two stable states for each of the waveforms, output conductors connected to each of said flip-flops, and means for applying said first control potential to trigger said output flip-flop into one state and said second control potential to trigger said output flip-flop into the other state, whereby the desired waveform is generated on said output conductor.

11. A synchronizing generator comprising a source of timing pulses, a first counter connected to count pulses from said source and having a radix equal to a minor cycle count, a second counter connected to count transfer pulses from said first counter and having a radix equal to a major cycle count, a third counter also connected to count transfer pulses from said first counter, means for obtaining potentials representative of digit outputs from said first counter corresponding to leading and trailing edge counts of pulses recurring at said minor cycle rate, means for obtaining potentials representative of digit outputs from said first and second counter corresponding to leading and trailing edge counts of pulses recurring at said major cycle rate, means for obtaining potentials representative of major cycle counting intervals from said second counter, means for combining digit potentials from said first counter with said counting interval potentials whereby said minor cycle counts are effective only during said major cycle interval, means for obtaining potentials representative of certain digit outputs from said third counter, means for combining said third counter digit potentials with potentials from said first counter whereby said minor cycle counts are effective only for said certain counts of said third counter, means for combining all the potentials corresponding to the leading edge counts of a waveform to establish a first trigger potential, means for combining all the potentials corresponding to the trailing edge counts of a waveform to establish a second trigger potential, an output flip-flop for each waveform having separate input means for controlling each state thereof, an output conductor connected to each of said flip-flops, and means for applying said first trigger potential of a waveform to one input means and said second trigger potential of a waveform to the other input means of an output flip-flop, whereby the desired waveform is generated on the output conductor from said output flip-flop.

12. Apparatus in accordance with claim 11 wherein said means for establishing a potential representative of a major cycle counting interval from said second counter includes means for obtaining digit potentials from said second counter corresponding to one unit less than the leading and trailing edge digits of said interval, an interval flip-flop having separate input means for controlling each state thereof, an output conductor connected to said interval flip-flop, and means for applying each of said digit potentials on one of the input means of said interval flip-flop along with the transfer pulse from said second counter, whereby said interval potential is established on said output conductor at the coincidence of said transfer pulse with said digit potential.

13. A synchronizing generator comprising a source of timing pulses, a first counter counting pulses from said source and having a radix corresponding to a minor half-cycle, a second counter counting transfer pulses from said first counter and having an odd number radix corresponding to a major cycle, a third counter also counting transfer pulses from said first counter and having a radix of two, means for establishing potentials representing specific digits in said first and second counters, means for establishing a potential representing a first interval count of the major cycle, means for inverting said latter potential to establish a potential representing the remaining interval count of the major cycle, means for combining digit potentials from said first counter with said first interval count potential of said major cycle counter to establish control potentials for pulses recurring at minor half-cycle rates during said first interval count, means for combining digit potentials from said first counter and said third counter with said remaining interval count potential of said major cycle counter to establish control potentials for pulses recurring at minor whole-cycle rates during said remaining interval count, an output flip-flop, an output conductor connected to the plate of said output flip-flop, and means for applying said control potentials to trigger said output flip-flop, whereby the leading edge of the first minor half-cycle pulse is spaced a minor whole-cycle period from the minor whole-cycle pulses every other major cycle and spaced a minor half-cycle period from the minor whole-cycle pulses the other major cycles, and whereby the trailing edge of the last minor half-cycle pulse is spaced a minor half-cycle period before the following minor whole-cycle pulses every other major cycle and spaced a minor whole-cycle period before the following minor whole-cycle pulses the other major cycles.

14. In an apparatus for generating a composite waveform having pulses of various durations, all of said pulses occurring at predetermined times in the waveform, the combination comprising: means for providing a source of recurring timing pulses; a cascade of counting circuits responsive to successive timing pulses for establishing potentials representative of certain digits; means for combining said digit potentials for establishing potentials representative of coded numbers corresponding to leading and trailing edges of the pulses in the composite waveform; a flip-flop circuit having a first component effective when operated to form the leading edge of a pulse, and a second component effective when operated to form the trailing edge of a pulse in the composite waveform; a first means for combining the leading edge potentials to generate trigger pulses to be applied on said first component; and a second means for combining the trailing edge potentials to generate trigger pulses to be applied on said second component, whereby as said counting circuits operate, said flip-flop circuit is operated in accordance with the established count potentials to form the pulses in the composite waveform.

15. In an apparatus for generating a composite waveform having pulses of various durations, all of said pulses occurring at predetermined times in the waveform, the combination comprising: means for providing a constant frequency source of pulses; a plurality of counting circuits adapted for counting said pulses; a count network connected to each of said counting circuits for establishing potentials representative of certain digits contained therein; means for combining digit potentials of said counting circuits to establish potentials representative of coded numbers corresponding to predetermined leading and trailing edges of the pulses in the composite waveform; a flip-flop circuit having a first component effective when operated to initiate a pulse and a second component effective when operated to terminate a pulse in the composite waveform; a first means responsive to the established leading edge potentials to generate trigger pulses to be applied on said first component; and a second means responsive to the established trailing edge potentials to generate trigger pulses to be applied on said second component, whereby as said counting circuits operate in response to successive timing pulses, said flip-flop circuit is operated by alternate trigger pulses from said first and second means to generate the pulses of the composite waveform.

16. In a complex waveform generator: a plurality of counters, each of said counters comprised of a plurality of flip-flop circuits and a counting network; means for supplying a source of timing pulses to said counting networks to change the states of said counting flip-flops circuits in a predetermined sequence; an output network responsive to the state of said counting flip-flops for establishing potentials representative of the digits of numbers corresponding to the leading and trailing edges of the waveform to be generated; circuit means for combining said digit potentials to establish control potentials representative of numbers corresponding to the leading and trailing edges of the waveform to be generated; an output flip-flop circuit adapted to be triggered back and forth for respectively forming the leading and trailing edges of a waveform; and means responsive to control potentials representing alternate leading and trailing edge numbers of a waveform to trigger said output flip-flop circuit accordingly.

ALBERT E. WOLFE, Jr.

References Cited in the file of this patent

UNITED STATES PATENTS

| Number | Name | Date |
|---|---|---|
| 2,298,863 | Bartelink | Oct. 13, 1942 |
| 2,298,864 | Bartelink | Oct. 13, 1942 |
| 2,516,972 | Gannaway | Aug. 1, 1950 |
| 2,525,102 | Schade | Oct. 10, 1950 |
| 2,536,808 | Higinbotham | Jan. 2, 1951 |
| 2,557,086 | Fisk et al. | June 19, 1951 |